US012691510B2

(12) United States Patent
Castanos et al.

(10) Patent No.: US 12,691,510 B2
(45) Date of Patent: Jul. 28, 2026

(54) BATTERY POWERED METAL SNIPS

(71) Applicant: MILWAUKEE ELECTRIC TOOL CORPORATION, Brookfield, WI (US)

(72) Inventors: Carmen J. Castanos, Milwaukee, WI (US); Kallol Barai, Milwaukee, WI (US); Hans T. Banholzer, Milwaukee, WI (US); Evan Brown, Milwaukee, WI (US); Julia C. Marsh, Milwaukee, WI (US); Coby A. Nettleton, Milwaukee, WI (US); Dominick S. Ropella, Wauwatosa, WI (US); Troy C. Thorson, Cedarburg, WI (US); Terry L. Timmons, Oconomowoc, WI (US); Kailie M. Romanski, Hartford, WI (US); Justin T. Bickman, Milwaukee, WI (US); Jacob R. McDonald, Ixonia, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 178 days.

(21) Appl. No.: 18/835,965

(22) PCT Filed: Feb. 6, 2023

(86) PCT No.: PCT/US2023/012400
§ 371 (c)(1),
(2) Date: Aug. 5, 2024

(87) PCT Pub. No.: WO2023/150342
PCT Pub. Date: Aug. 10, 2023

(65) Prior Publication Data
US 2025/0135561 A1 May 1, 2025

Related U.S. Application Data

(60) Provisional application No. 63/358,742, filed on Jul. 6, 2022, provisional application No. 63/338,080, filed
(Continued)

(51) Int. Cl.
*B23D 29/00* (2006.01)

(52) U.S. Cl.
CPC ................................. *B23D 29/005* (2013.01)

(58) Field of Classification Search
CPC .... B23D 29/005; B23D 29/026; B23D 29/02; B23D 27/00; B23D 17/00; B23D 21/06;
(Continued)

(56) References Cited

U.S. PATENT DOCUMENTS

| 2,637,103 A | 5/1953 | Hooker |
| 3,074,163 A | 1/1963 | Wohler et al. |

(Continued)

FOREIGN PATENT DOCUMENTS

| CN | 101653082 A | 2/2010 |
| CN | 202190569 U | 4/2012 |

(Continued)

OTHER PUBLICATIONS

International Search Report and Written Opinion for Application No. PCT/US2023/012400 dated May 30, 2023 (11 pages).

*Primary Examiner* — Phong H Nguyen

(74) *Attorney, Agent, or Firm* — Michael Best & Friedrich LLP

(57) ABSTRACT

A power tool is disclosed and includes a housing and a motor disposed within the housing. The power tool further includes a first blade and a second blade movable relative to the first blade by the motor. During operation, a cutting stroke length of the first blade relative to the second blade is selectively adjustable based on a direction of rotation of the motor.

16 Claims, 30 Drawing Sheets

Related U.S. Application Data on May 4, 2022, provisional application No. 63/307,339, filed on Feb. 7, 2022.

(58) Field of Classification Search
CPC . A01G 3/00; A01G 3/02; A01G 3/033; A01G 3/037; A01G 3/08; A01G 3/085; A01G 3/053
USPC .................. 30/228, 194, 244, 254, 246, 249
See application file for complete search history.

(56) References Cited

U.S. PATENT DOCUMENTS

| | | | |
|---|---|---|---|
| 3,596,355 A | 8/1971 | Wertepay, Sr. | |
| 3,787,742 A * | 1/1974 | Murphy | B26B 15/00 |
| | | | 200/332.2 |
| 4,369,576 A | 1/1983 | McVaugh | |
| 4,989,322 A | 2/1991 | Clayton | |
| 5,002,135 A | 3/1991 | Pellenc | |
| 5,867,909 A * | 2/1999 | Jeltsch | A01G 3/037 |
| | | | 30/216 |
| 5,875,554 A | 3/1999 | Vogelsanger | |
| 5,953,822 A | 9/1999 | Vogelsanger | |
| 6,014,810 A | 1/2000 | Earle et al. | |
| 6,092,290 A | 7/2000 | Vogelsanger | |
| 8,122,607 B2 | 2/2012 | Maniwa et al. | |
| 8,276,280 B2 | 10/2012 | Lee et al. | |
| 8,327,548 B2 | 12/2012 | Ronan | |
| 8,656,597 B2 | 2/2014 | Pellenc | |
| 8,683,704 B2 | 4/2014 | Scott et al. | |
| 8,813,370 B2 | 8/2014 | Pellenc | |
| 8,875,404 B2 | 11/2014 | Scott et al. | |
| 8,893,390 B2 | 11/2014 | Nie et al. | |
| 9,179,605 B2 | 11/2015 | Yamaoka et al. | |
| 9,339,938 B2 | 5/2016 | Winkel et al. | |
| 9,434,013 B2 | 9/2016 | Johnson et al. | |
| 9,486,865 B2 | 11/2016 | Scott et al. | |
| 9,565,806 B2 | 2/2017 | Maag et al. | |
| 9,757,868 B2 | 9/2017 | Winkel et al. | |
| 9,796,099 B2 | 10/2017 | Sandefur | |
| 9,872,440 B2 | 1/2018 | Bieler et al. | |
| 9,888,632 B2 | 2/2018 | Zhou et al. | |
| 10,046,468 B2 | 8/2018 | Sandefur | |
| 10,307,918 B2 | 6/2019 | Chen | |
| 10,449,680 B2 | 10/2019 | Sandefur et al. | |
| 10,537,069 B2 | 1/2020 | Wykman et al. | |
| 10,681,873 B2 | 6/2020 | Pellenc et al. | |
| 10,780,593 B2 | 9/2020 | Sandefur et al. | |
| 10,888,936 B2 | 1/2021 | Puzio et al. | |
| 11,045,962 B2 | 6/2021 | Li | |
| 11,130,251 B2 | 9/2021 | Pellenc et al. | |
| 11,161,262 B2 | 11/2021 | Anwar et al. | |
| 11,179,860 B2 | 11/2021 | Sandefur et al. | |
| 2002/0066447 A1 | 6/2002 | Gaidjiergis et al. | |
| 2005/0115081 A1 * | 6/2005 | Tu | B26B 15/00 |
| | | | 30/228 |
| 2005/0160606 A1 * | 7/2005 | Yao | B26B 15/00 |
| | | | 30/228 |
| 2007/0050991 A1 | 3/2007 | Mooney et al. | |
| 2009/0277022 A1 | 11/2009 | Limberg et al. | |
| 2010/0077621 A1 | 4/2010 | Quigley et al. | |
| 2012/0011729 A1 | 1/2012 | Kim et al. | |
| 2013/0019481 A1 | 1/2013 | Yamaoka et al. | |
| 2013/0025135 A1 | 1/2013 | Gejervall et al. | |
| 2014/0047719 A1 | 2/2014 | Shimizu et al. | |
| 2014/0157522 A1 | 6/2014 | Lorini | |
| 2014/0182137 A1 | 7/2014 | Liu et al. | |
| 2014/0283392 A1 | 9/2014 | Mezher | |
| 2019/0151967 A1 | 5/2019 | Kehoe et al. | |
| 2020/0139459 A1 | 5/2020 | Nagasaka et al. | |
| 2020/0316697 A1 | 10/2020 | Ohta et al. | |
| 2020/0347991 A1 | 11/2020 | Pellenc et al. | |
| 2021/0069805 A1 | 3/2021 | Gregorich et al. | |
| 2021/0076572 A1 | 3/2021 | Lam et al. | |
| 2021/0162619 A1 | 6/2021 | Pellenc et al. | |
| 2021/0252316 A1 | 8/2021 | Sauerbier et al. | |
| 2021/0323177 A1 | 10/2021 | Li | |
| 2021/0394377 A1 | 12/2021 | Anwar et al. | |

FOREIGN PATENT DOCUMENTS

| | | |
|---|---|---|
| CN | 102907268 A | 2/2013 |
| CN | 203380916 U | 1/2014 |
| CN | 203542633 U | 4/2014 |
| CN | 205671043 U | 11/2016 |
| CN | 108481371 A | 9/2018 |
| CN | 208242301 U | 12/2018 |
| CN | 208924728 U | 6/2019 |
| CN | 110161920 A | 8/2019 |
| CN | 209949936 U | 1/2020 |
| CN | 210183971 U | 3/2020 |
| CN | 211832007 U | 11/2020 |
| CN | 212436494 U | 2/2021 |
| CN | 212577646 U | 2/2021 |
| CN | 214385196 U | 10/2021 |
| CN | 114467531 A | 5/2022 |
| DE | 8814543 U1 | 1/1989 |
| DE | 9401672 U1 | 3/1994 |
| EP | 0812044 A1 | 12/1997 |
| EP | 3141356 A1 | 3/2017 |
| EP | 3552478 A2 | 10/2019 |
| EP | 3616860 A2 | 3/2020 |
| KR | 20090020987 A | 2/2009 |
| KR | 20210120605 A | 10/2021 |
| WO | WO8903171 A1 | 4/1989 |
| WO | WO2009117779 A1 | 10/2009 |
| WO | WO2010031542 A4 | 3/2010 |
| WO | WO2017060849 A1 | 4/2017 |
| WO | WO2019004890 A1 | 1/2019 |
| WO | WO2021049641 A1 | 3/2021 |
| WO | WO2021062392 A1 | 4/2021 |
| WO | WO2021194296 A1 | 9/2021 |
| WO | WO2021215291 A1 | 10/2021 |

* cited by examiner

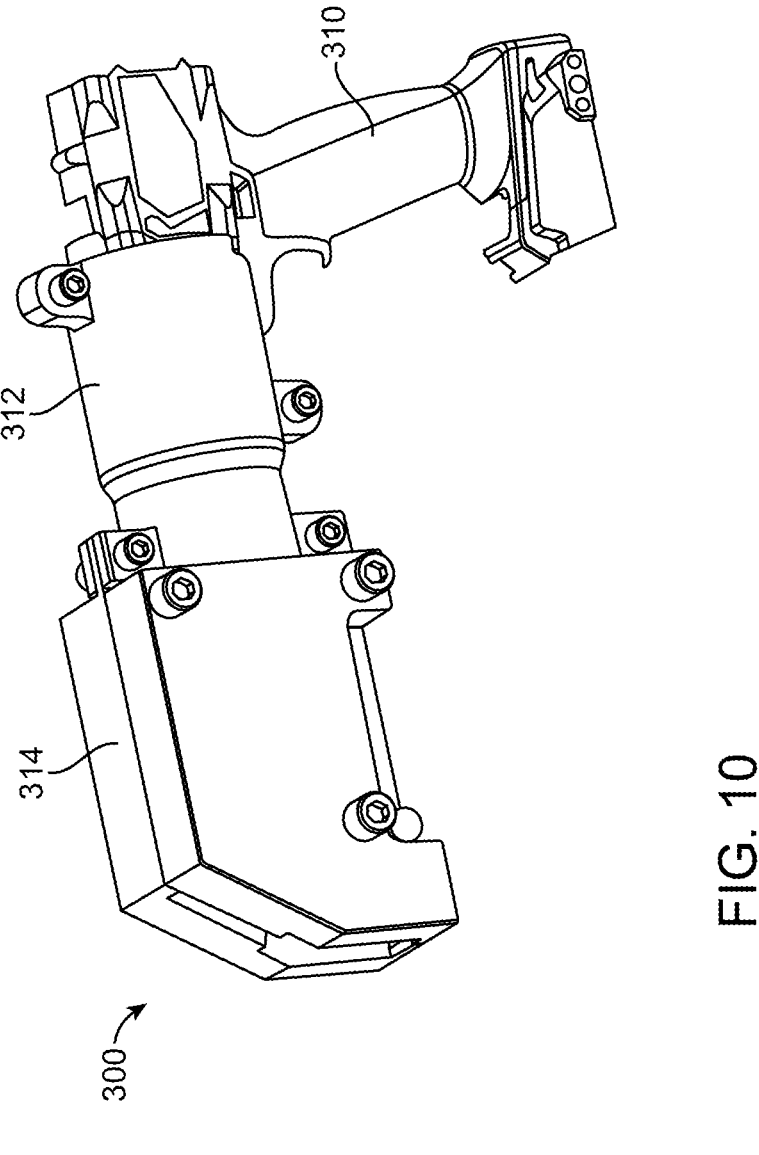
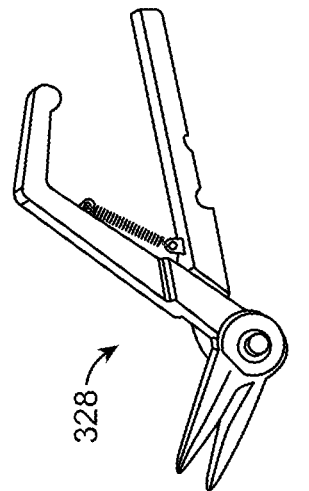
FIG. 10

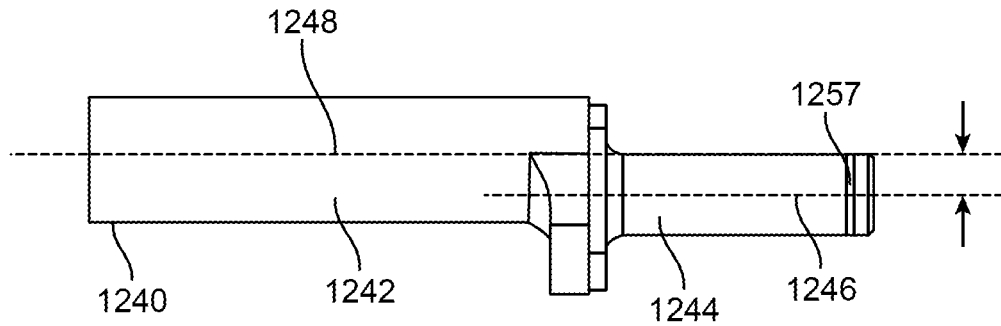
FIG. 15
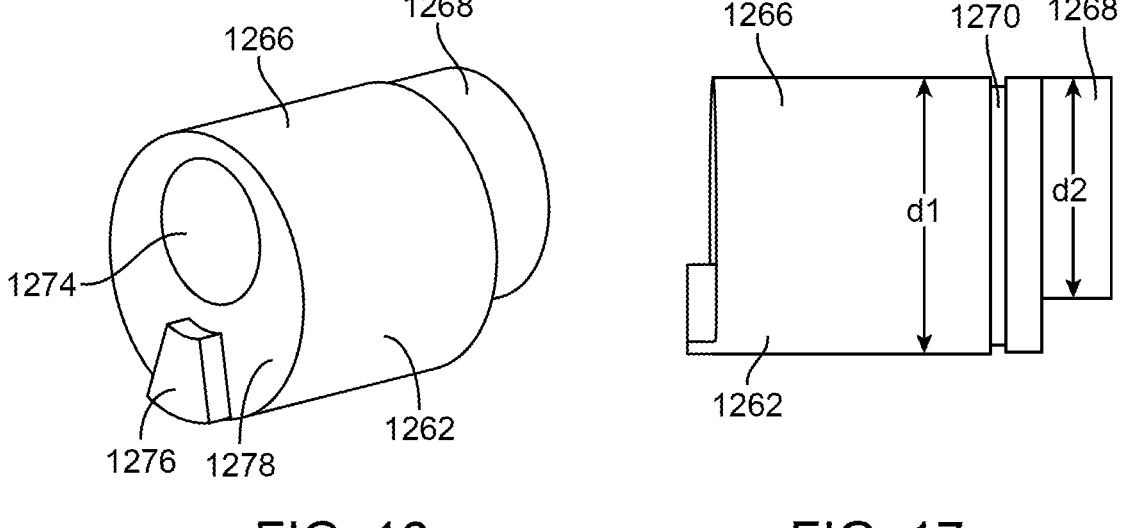
FIG. 16                    FIG. 17

1240

1262

1240

1262

2022

2126

Sprag

2226

2326

2422

BATTERY POWERED METAL SNIPS

CROSS-REFERENCE TO RELATED APPLICATIONS

This application claims priority to U.S. Provisional Patent Application No. 63/307,339 filed on Feb. 7, 2022, U.S. Provisional Patent Application No. 63/338,080 filed on May 4, 2022, and U.S. Provisional Patent Application No. 63/358,742 filed on Jul. 6, 2022, the entire contents of each of which are incorporated herein by reference.

FIELD

The present disclosure relates to metal fabrication tools, and more particularly to battery powered metal snips.

BACKGROUND

Metal fabrication typically includes welding metal parts and pieces together. Many times, prior to welding, the metal must be cut to specific shapes. These cutting operations can be accomplished using certain cutting tools such as chops saw for heavy stock and hand operated snips for light gauge metal. The industry is always in need of new tools to make the fabrication of metal easier and more efficient.

SUMMARY

In an embodiment of the disclosure, a power tool is disclosed and includes a housing and a motor disposed within the housing. The power tool further includes a first blade and a second blade movable relative to the first blade by the motor. During operation, a cutting stroke length of the first blade relative to the second blade is selectively adjustable based on a direction of rotation of the motor.

In another embodiment of the present disclosure, metal snips are disclosed and include a housing, a motor disposed within the housing, and an eccentric drive assembly engaged with the motor and rotating therewith. The eccentric drive assembly includes an eccentric shifter, wherein the eccentric shifter is movable between a first position having a first eccentric drive distance and a second position having a second eccentric drive distance. The metal snips further include a blade assembly extending from the housing. The blade assembly includes a lower blade and an upper blade, at least one of the upper blade or the lower blade is operably coupled to the eccentric drive assembly and a cutting stroke length between the upper blade and lower blade selectively changes as the eccentric shifter moves between the first position and the second position.

In another embodiment of the disclosure, metal snips are disclosed and include a housing, a motor disposed within the housing, and an eccentric drive assembly engaged with the motor and rotating therewith, the eccentric drive assembly including an eccentric shifter and a cam disposed on the eccentric shifter. The metal snips further include a blade assembly extending from the housing. The blade assembly includes a fixed upper blade and a rotating lower blade having a lower cam follower arm engaged with the cam. The eccentric shifter is movable between a first position having a first eccentric drive distance corresponding to a first cutting stroke length and a second position having a second eccentric drive distance corresponding to a second cutting stroke length that is different from the first cutting stroke length.

In another aspect of the disclosure, metal snips are disclosed and a housing, a motor disposed within the housing. an eccentric drive assembly engaged with the motor and rotating therewith, the eccentric drive assembly including an eccentric shifter and a cam disposed on the eccentric shifter, a cutting head operably coupled to the eccentric drive assembly. The cutting head includes a first blade assembly receptacle, a second blade assembly receptacle, and a blade release mechanism adjacent the first blade assembly receptacle and the second blade assembly receptacle. The blade release mechanism is movable between a first locked position in when the blade release mechanism retains a first blade assembly within the first blade assembly receptacle and an unlocked position in which the first blade assembly is removable from the first blade assembly receptacle.

In still another aspect of the disclosure, a power tool is disclosed and includes a housing, a motor disposed within the housing, a gearbox disposed within the housing and operably coupled to the motor, a first blade, and a second blade movable relative to the first blade by the motor via the gearbox, wherein the gearbox is operable to provide at least two operating speeds for the second blade.

Other features and aspects of the disclosure will become apparent by consideration of the following detailed description and accompanying drawings.

BRIEF DESCRIPTION OF THE DRAWINGS

FIG. 10 is a perspective view of the second metal snips in accordance with an embodiment of the present disclosure with the blades removed.

FIG. 15 is a side view of the eccentric drive shaft for the eccentric drive assembly of FIG. 13 in accordance with an embodiment of the present disclosure.

FIG. 16 is a perspective view of an eccentric shifter for the eccentric drive assembly of FIG. 13 in accordance with an embodiment of the present disclosure.

FIG. 17 is a side view of the eccentric drive shaft for the eccentric drive assembly of FIG. 13 in accordance with an embodiment of the present disclosure.

Before any embodiments of the present disclosure are explained in detail, it is to be understood that the embodiments described herein are not limited in scope or application to the details of construction and the arrangement of components set forth in the following description or as illustrated in the following drawings. The devices described herein are capable of other embodiments and of being practiced or of being carried out in various ways. Also, it is to be understood that the phraseology and terminology used herein is for the purpose of description and should not be regarded as limiting.

DETAILED DESCRIPTION

Figure 1:
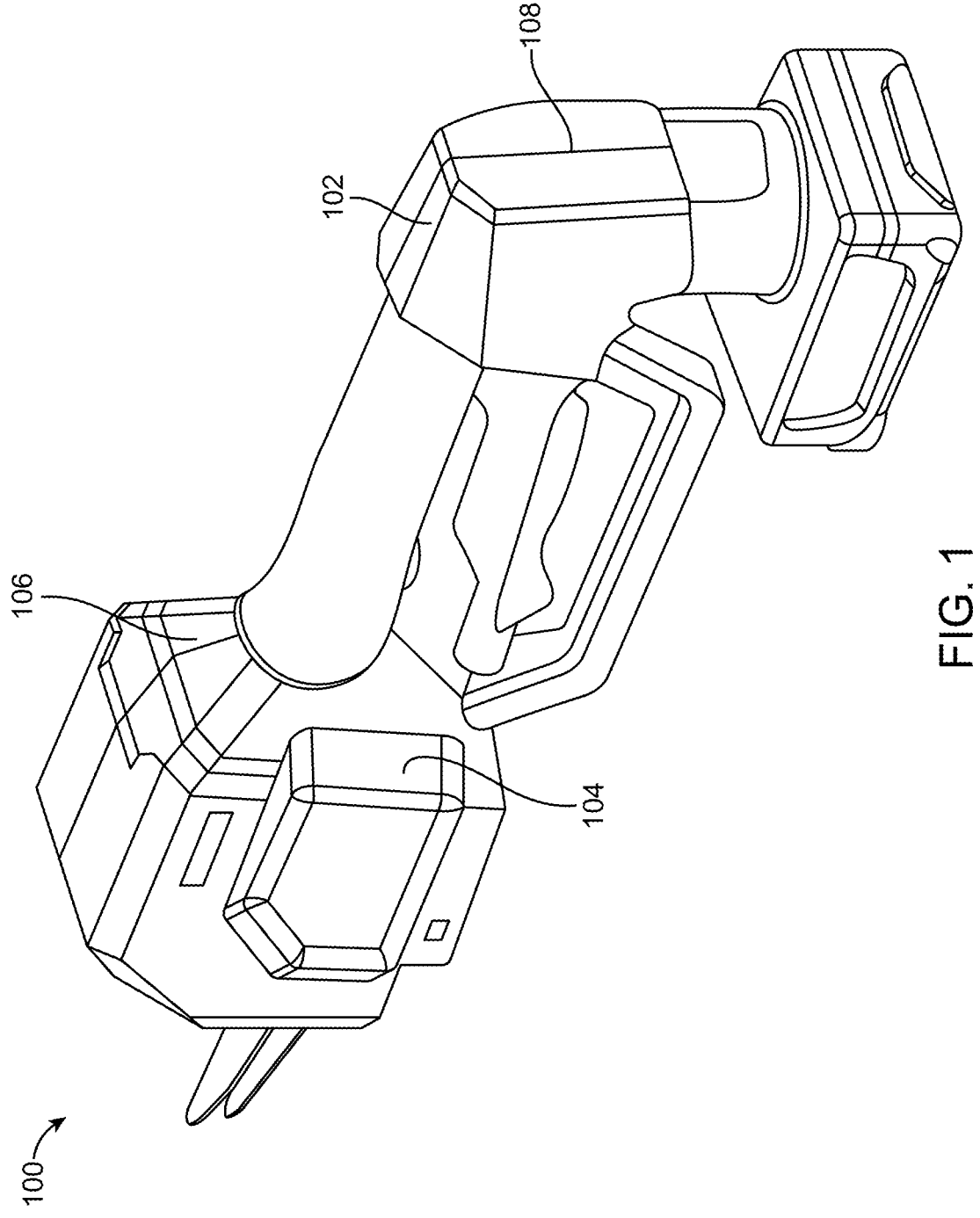
FIG. 1 is a perspective view of metal snips in accordance with a first embodiment of the present disclosure.
Figure 2:
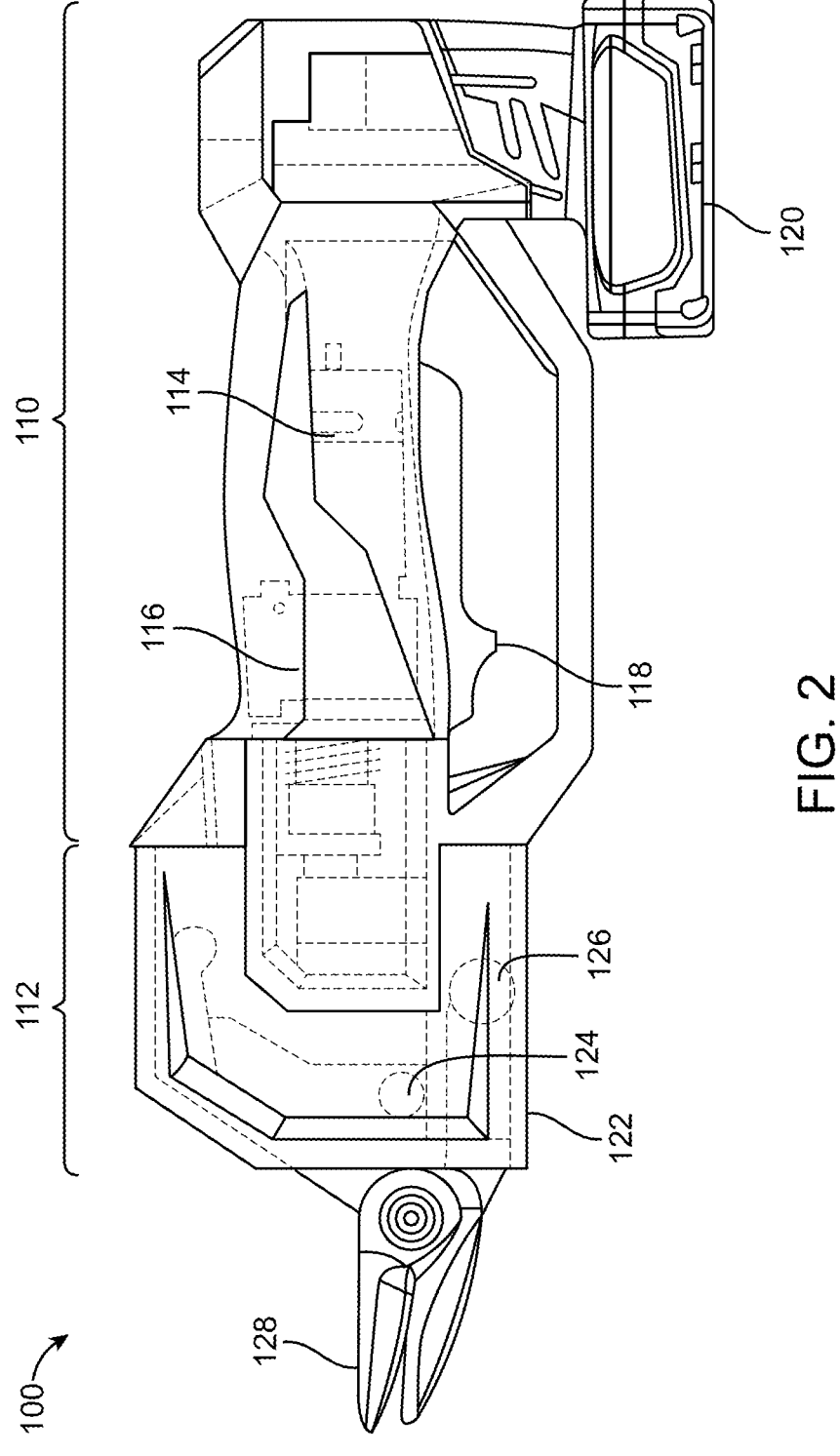
FIG. 2 is a left side view of the first metal snips with portions of the housing transparent.
Figure 3:
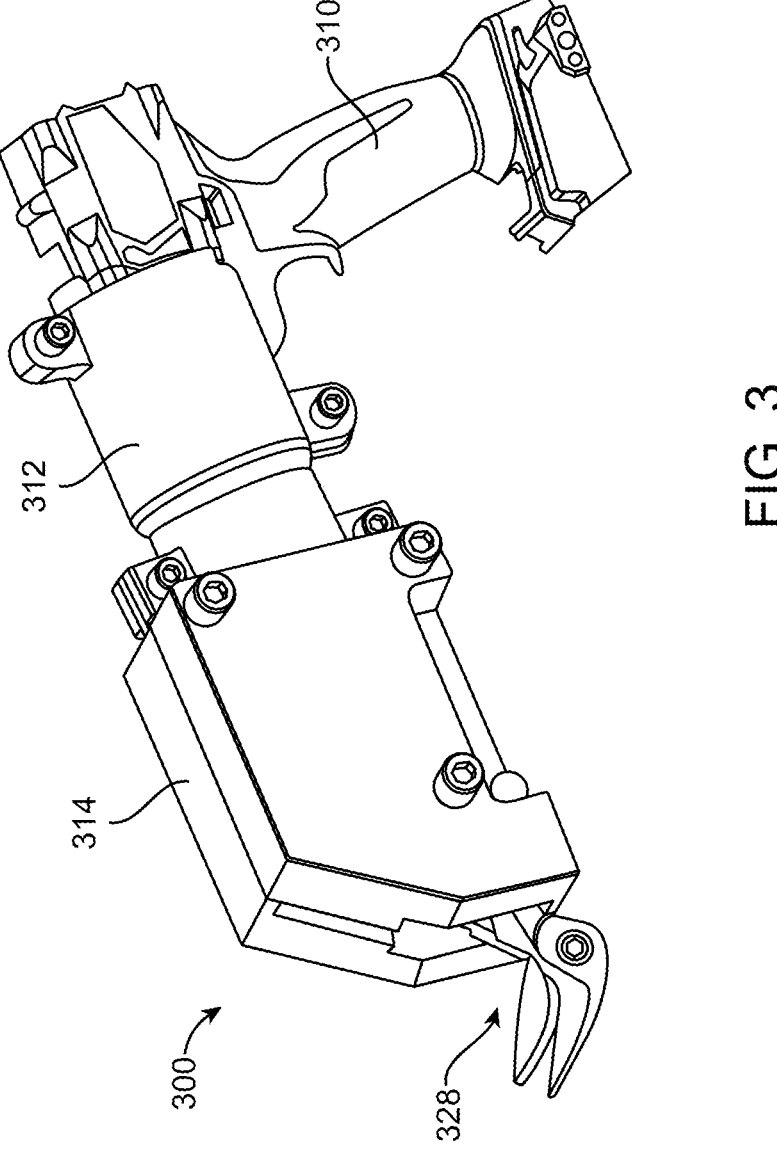
FIG. 3 is a perspective view of metal snips in accordance with a second embodiment of the present disclosure with portions of a housing removed for clarity.

Referring to FIG. 1 and FIG. 2, a first embodiment of metal snips is illustrated and is generally designated 100. As illustrated in FIG. 1, the metal snips 100 include a housing 102 that includes a first housing side 104 and a second housing side 106. As shown in FIG. 1, the housing sides 104, 106 meet to form an interface 108 between the housing sides 104, 106. It is to be understood that the housing sides 104, 106 are attached, or otherwise affixed, to each other via a plurality of fasteners, e.g., screws, that are not shown in the figures. Alternatively, the housing sides 104, 106 are affixed to each other via an adhesive or via a plastic welding operation.

As depicted in FIG. 2, the housing 102 defines a handle portion 110 and a cutting head portion 112. The handle portion 110 includes a motor 114 operably coupled to a gearbox 116 via a motor output shaft. A trigger 118 is operably coupled to the motor 114. A battery 120 is removably engaged with the handle portion 110. As further shown in FIG. 2, a cutting head 122 is disposed within the cutting head portion 112 of the housing 102. The cutting head 122 may include a cutting mechanism 124 having a cam selector 126 and a blade assembly 128. Further details of the cutting head 122 are illustrated in conjunction with the description of the cutting head of the second embodiment of metal snips described below. It is to be understood that the trigger 118 may be actuated by a user in order to energize the motor 114 and in turn, actuate the cutting mechanism 124 of the cutting head 122. As such, the metal snips 100 are capable of cutting metal of various gauge sizes, as described in greater detail below.

Figure 4:
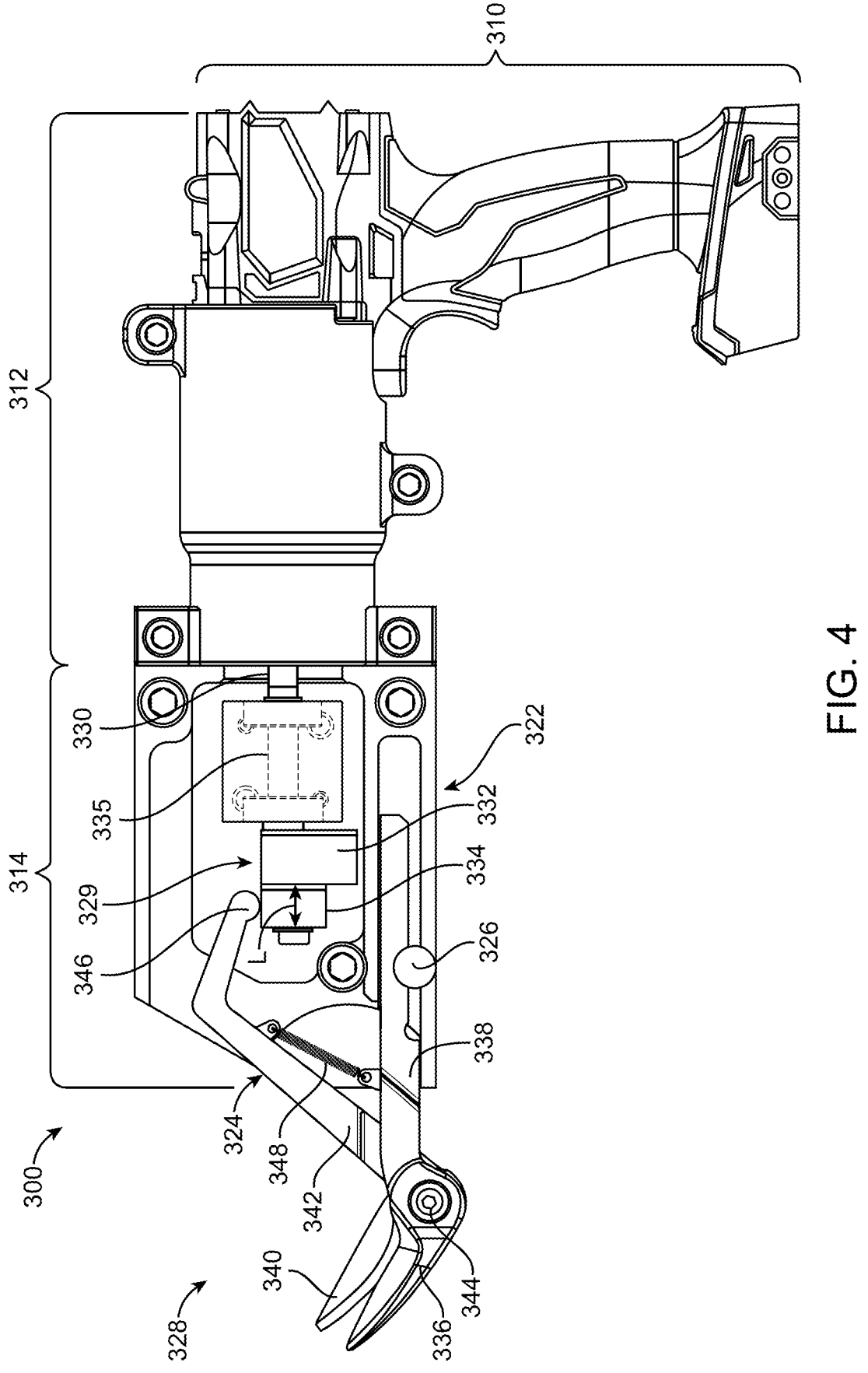
FIG. 4 is a left side view of the second metal snips in accordance with an embodiment of the present disclosure with portions of the housing removed.

Referring now to FIG. 3-FIG. 12, a second embodiment of metal snips is illustrated and is generally designated 300. As illustrated in FIG. 4, the metal snips 300 include a housing 302 that includes a handle portion 310, a motor portion 312, and a cutting head portion 314. The motor portion 312 includes a motor operably coupled to a gearbox via a motor output shaft. The handle portion 310 includes a trigger that is operably coupled to the motor. A battery is removably engaged with the handle portion 310. As further shown in FIG. 4, a cutting head 322 is disposed within the cutting head portion 314 of the housing 102. The cutting head 322 may include a cutting mechanism 324 having a cam selector 326 and a blade assembly 328. The cutting head 322 also includes an eccentric drive assembly 329 that is coupled to a gear box output shaft 330 that extends from the motor portion 312 of the housing 302.

As shown in FIG. 4, the eccentric drive assembly 329 includes a first cam 332 and a second cam 334 rotatably disposed on an eccentric drive shaft 335 that is coupled to the gear box output shaft 330. The first cam 332 is larger than the second cam 334. It can be appreciated that more than two cams 332, 334 may be disposed on the eccentric drive shaft 335. Further, it can be appreciated that a single cam of varying size may be disposed on the eccentric drive shaft 335. The cutting mechanism 324 includes a non-rotating lower blade 336 that has a cam selector engagement arm 338 fixed thereto. It is to be understood that the non-rotating lower blade 336 does not rotate. However, the non-rotating lower blade 336 translates linearly with the cam selector engagement arm 338, as described in greater detail below. The cutting mechanism 324 also includes a rotating upper blade 340 that includes a cam follower arm 342 extending therefrom. As described in greater detail below, the rotating upper blade 340 rotates about a pivot 344 and translates linearly with the non-rotating lower blade 336 and the cam selector engagement arm 338. The cam follower arm 342 includes an enlarged cam follower end 346. The cutting mechanism 324 further includes a spring 348 disposed between the cam follower arm 342 and the cam selector engagement arm 338 to bias the cam follower arm 342 toward the cam selector engagement arm 338 and to maintain the cam follower end 346 in contact with the first cam 332 or the second cam 334 during operation of the metal snips 300. In the embodiment illustrated, the cam follower arm 342 extends from the rotating upper blade 340. In an alternative embodiment, the upper blade 340 may be fixed and the lower blade 336 may rotate. In such an embodiment, the lower blade 336 may include a cam follower arm with a cam follower end that is designed to contact the cams 332, 334 and move as the cams 332, 334 rotate.

Figure 5:
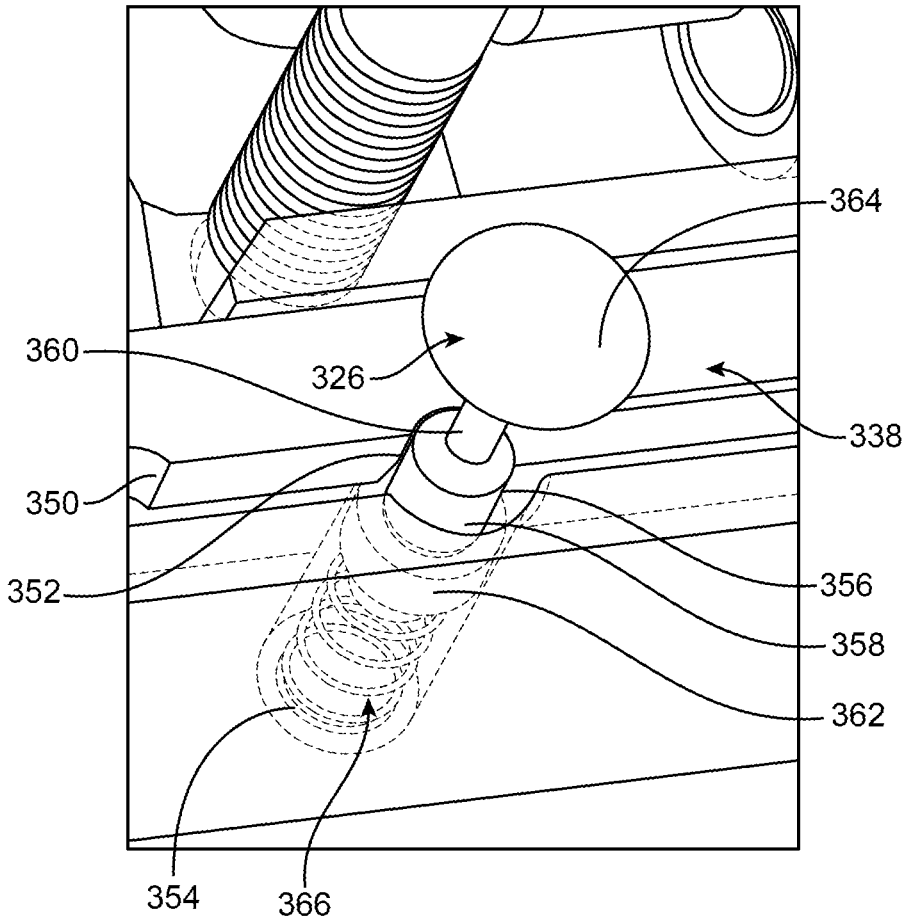
FIG. 5 is a first detailed view of a blade locking mechanism according to an embodiment of the present disclosure with a cam selector in a locked position.
Figure 6:
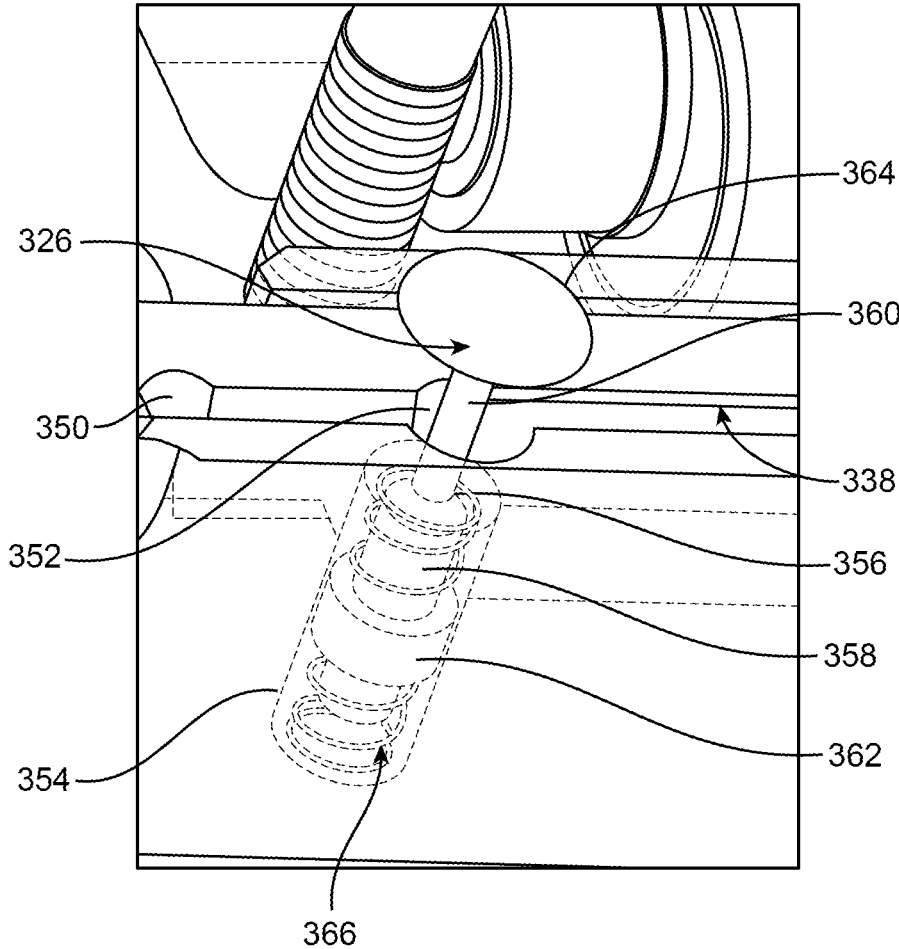
FIG. 6 is a second detailed view of a blade locking mechanism according to an embodiment of the present disclosure with a cam selector in an unlocked position.

FIG. 5 and FIG. 6 further indicate that the cam selector engagement arm 338 includes a first detent 350 and a second detent 352. The detents 350, 352 are spaced apart a distance D that corresponds to the axial length L of the second cam 334. As illustrated in FIG. 5 and FIG. 6, the cam selector 326 is at least partially disposed within a cam selector bore 354. Moreover, the cam selector 326 includes a generally cylindrical shaft 356 having a lower shaft portion 358 and an upper shaft portion 360. As shown, the diameter of the lower shaft portion 358 is larger than the diameter of the upper shaft portion 360. The cam selector 326 also includes a lower cap 362 disposed on the lower end of the lower shaft portion 358 and an upper cap 364 disposed on the upper end of the upper shaft portion 360. The diameter of the lower cap 362 is larger than the diameter of the lower shaft portion 358. The diameter of the upper cap 364 is greater than or equal to the diameter of the lower cap 362. A spring 366 is disposed within the cam selector bore 354 between a bottom 368 of the cam selector bore 354 and the lower cap 362 of the shaft 356 of the cam selector 326. The spring 366 biases the cam selector 326 outward relative to the cam selector bore 354 to a locked position in which the lower cap 362 engages the cam selector engagement arm 338 to prevent the cam selector 326 from moving entirely out of the cam selector bore 354. In the locked position, the lower shaft portion 358 of the cam selector 326 fits into and engages either the first detent 350 or the second detent 352, as illustrated in FIG. 5. Further, when the cam selector 326 is in the locked position, the cam selector engagement arm 338 of the lower blade 336 of the cutting mechanism 324 is unable to translation relative to the cam selector 326 and the cam follower arm 342 is engaged with either the first cam 332 or the second cam 334. For example, as illustrated in FIG. 7, the cam follower arm 342 is engaged with the first cam 332 and as illustrated in FIG. 8, the cam follower arm 342 is engaged with the second cam 334.

As shown in FIG. 6, when the cam selector 326 is pushed inward against the spring 366 within the cam selector bore 354, as depicted in FIG. 6, the lower cap 362 compresses the spring 366 and the lower shaft portion 358 moves into the cam selector bore 354 away from the second detent 352 and disengages the second detent 352. The smaller diameter of the upper shaft portion 360 allows the cam selector 326 to clear the second detent 352 which allows the cam selector engagement arm 338 to move linearly relative to the cam selector 326 so that the cam follower arm 342, and the cam follower end 346 move from the second cam 334 to the first cam 332. The cam selector 326 can be released to allow the spring 366 to return the cam selector 326 to the lock position in which the lower shaft portion 358 engages the first detent 350, as illustrated in FIG. 7.

Figure 7:
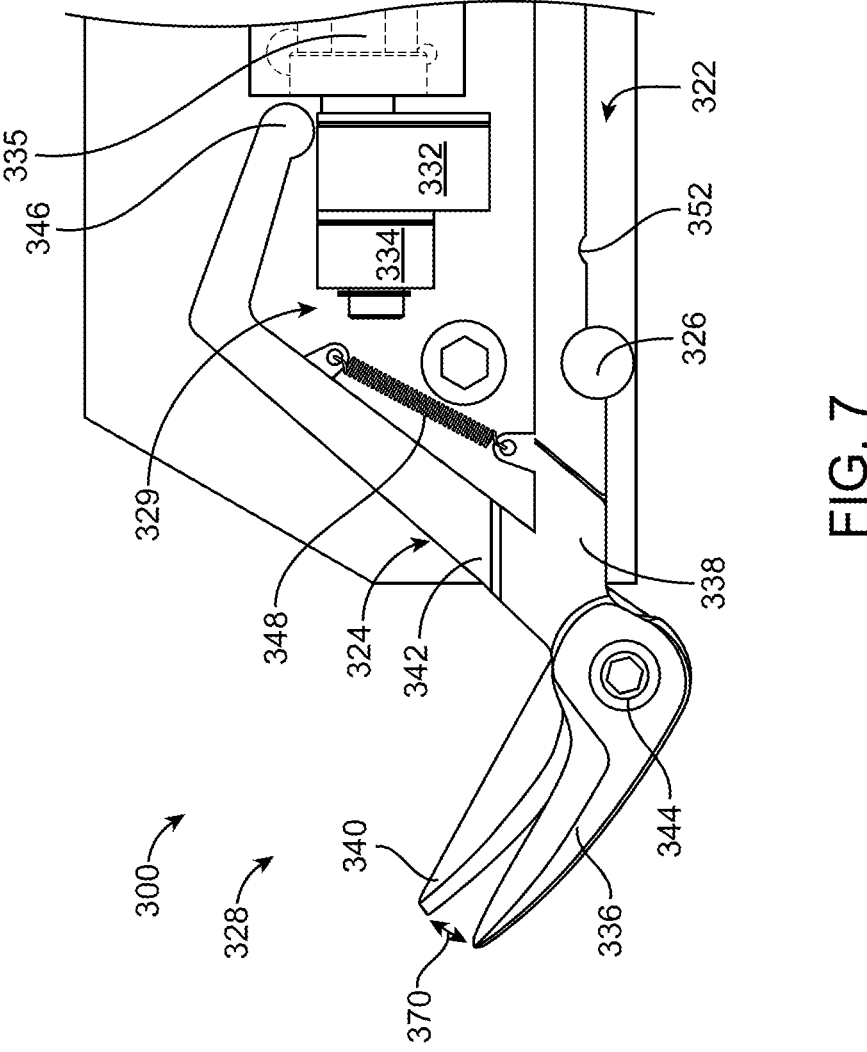
FIG. 7 is a first detailed left side view of the second metal snips in accordance with an embodiment of the present disclosure with portions of the housing removed and the blades moved a first maximum open position.
Figure 8:
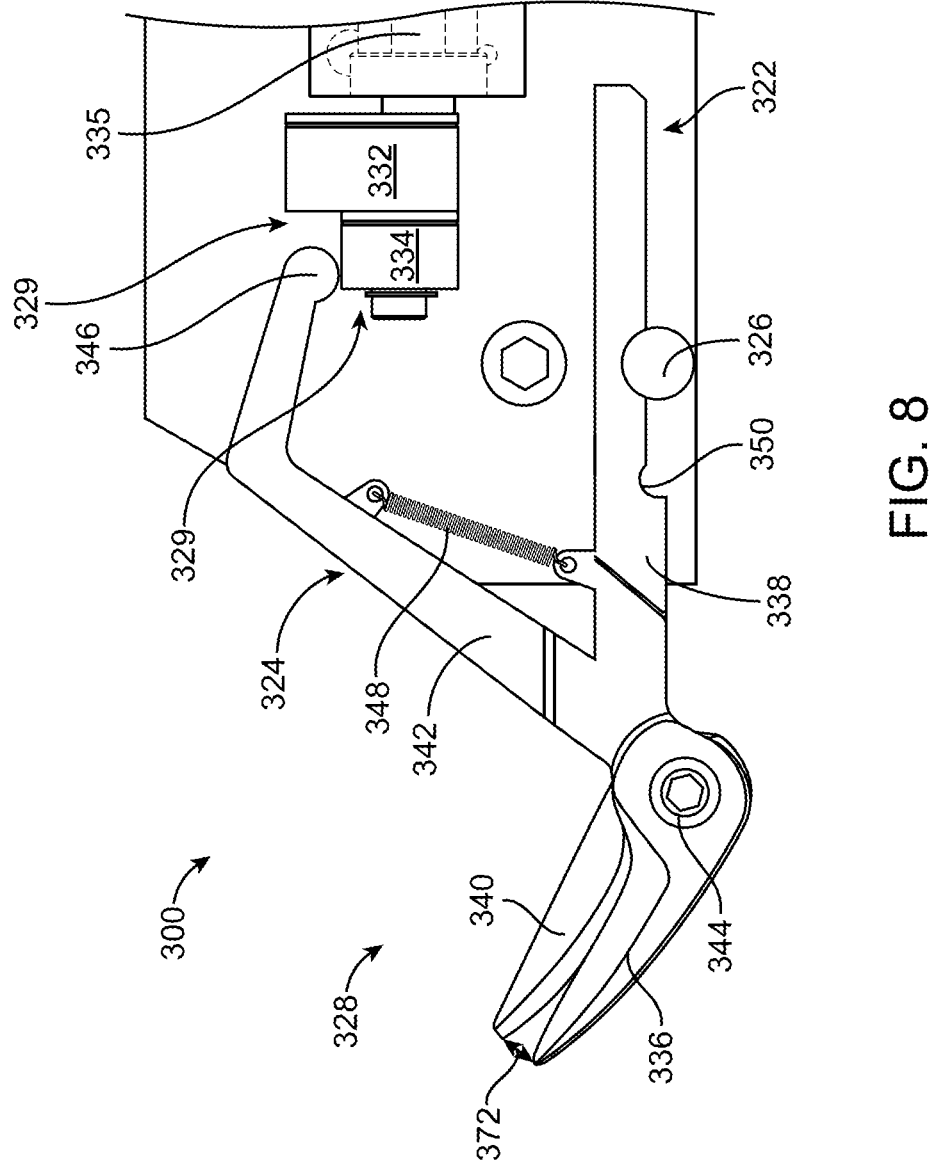
FIG. 8 is a second detailed left side view of the second metal snips in accordance with an embodiment of the present disclosure with portions of the housing removed and the blades moved a second maximum open position.
Figure 9:
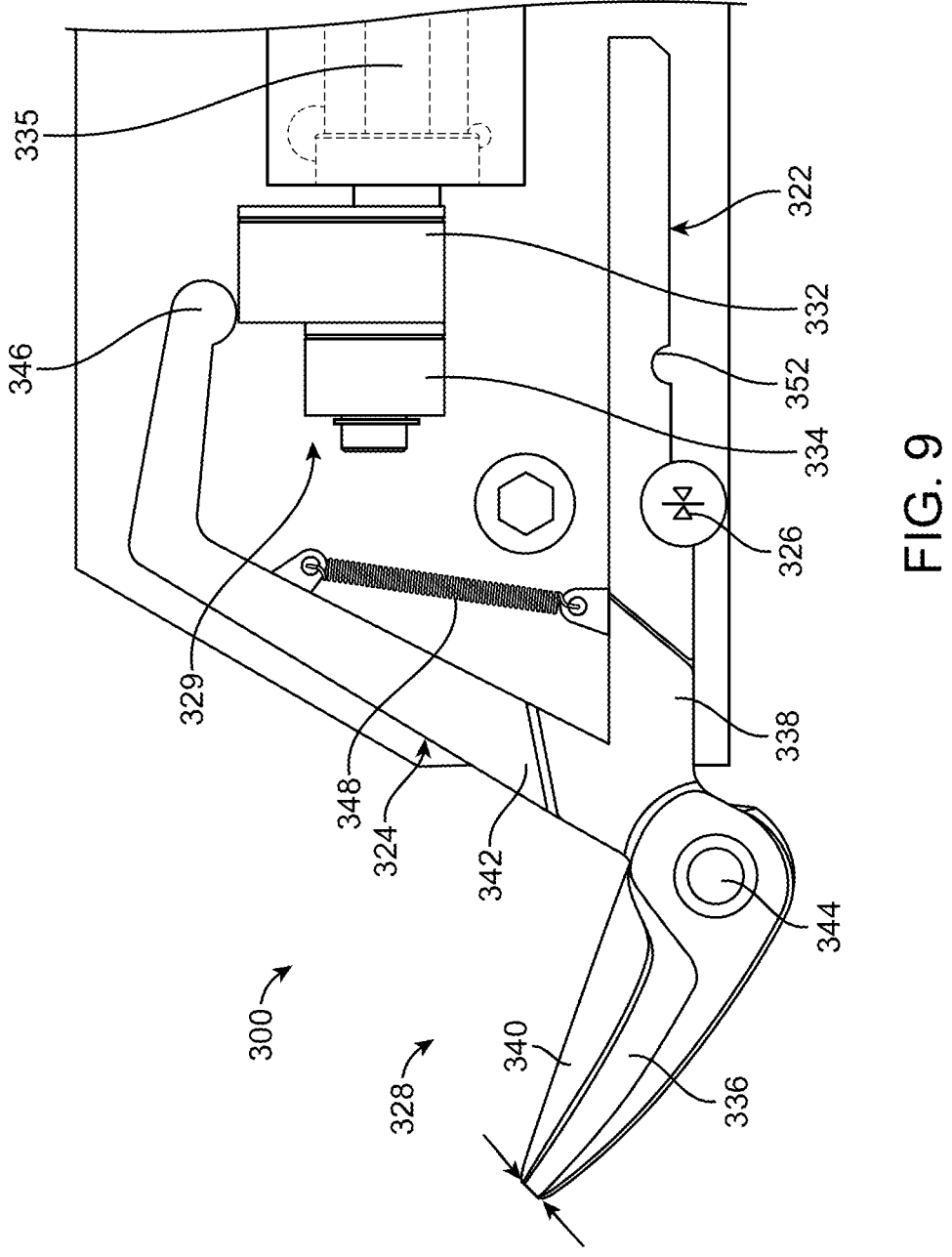
FIG. 9 is a third detailed left side view of the second metal snips in accordance with an embodiment of the present disclosure with portions of the housing removed and the blades moved a full closed position.
Figure 11:
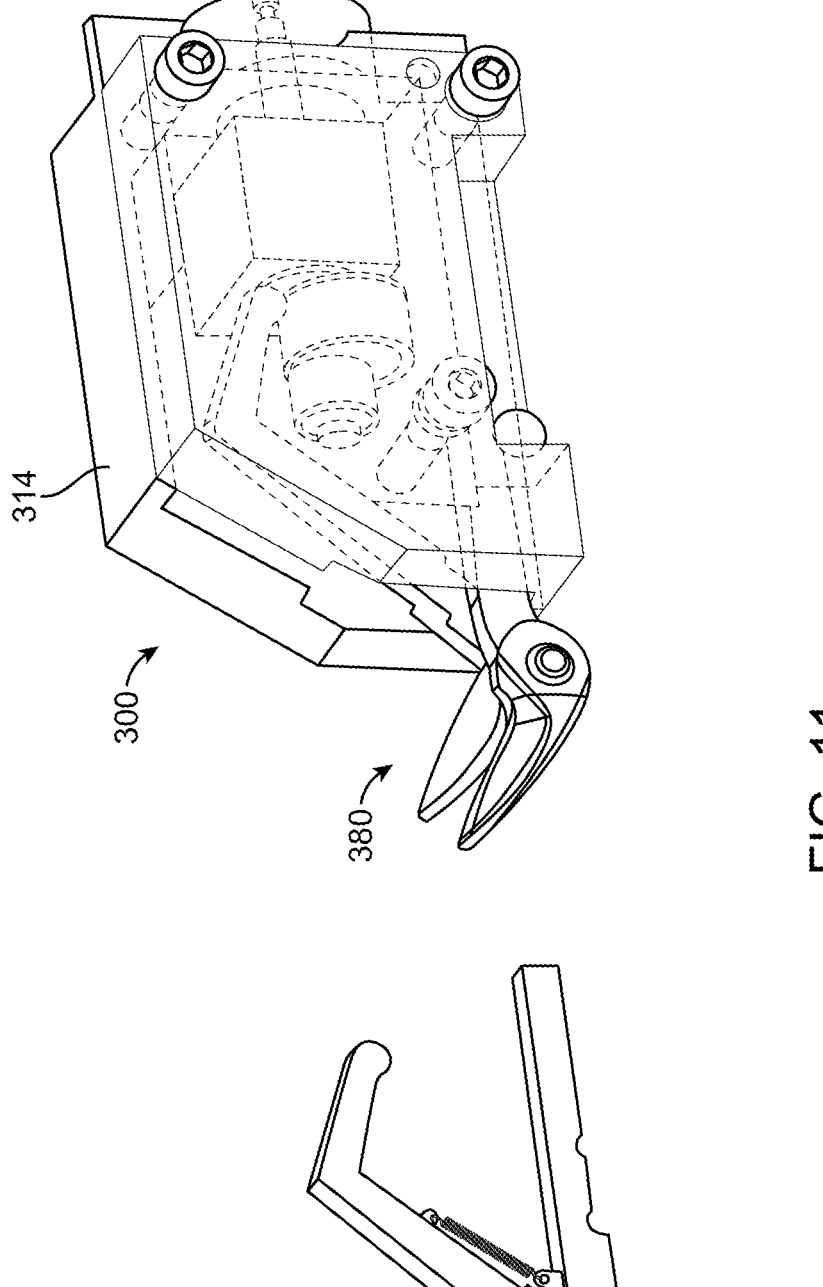
FIG. 11 is a perspective view of the second metal snips in accordance with an embodiment of the present disclosure with the right-side cutting blades replaced with left side cutting blades.

As illustrated in FIG. 7-FIG. 9, the metal snips 300 are operable in two cutting modes. In the first cutting mode, the cam selector 326 is engaged with the first detent 350 on the cam selector engagement arm 338 of the lower blade 336. Further, in the first cutting mode, depicted in FIG. 7, the cam follower arm 342 of the upper blade 340 is engaged with the first cam 332. In the first cutting mode, the metal snips 300 have the longest cutting stroke and the opening measured at the tip of the blades 336, 340 moves between a first maximum open position 370, shown in FIG. 7, and full closed position shown in FIG. 9. The first maximum open position 370 is approximately 9.9 millimeters (mm).

In the second cutting mode, the cam selector 326 is engaged with the second detent 352 on the cam selector engagement arm 338 of the lower blade 336. Moreover, in the second cutting mode, depicted in FIG. 8, the cam follower arm 342 of the upper blade 340 is engaged with the second cam 334. In the second cutting mode, the metal snips 300 have the shortest cutting stroke and the opening measured at the tip of the blades 336, 340 moves between a second maximum open position 372, shown in FIG. 8, and full closed position shown in FIG. 9. The second maximum open position 372 is approximately 6 millimeters (mm). Accordingly, the first maximum open position 370 is at least 50% greater than the second maximum open position 372. It is to be understood that the cutting stroke corresponds to the linear cut that the metal snips 300 make relative to the workpiece per complete blade cycle. A complete blade cycle corresponds to a complete revolution of the first cam 332 or the second cam 334 engaged with the cam follower arm 342. A shorter cutting stroke facilitates the cutting of heavier gauge material. A longer cutting stroke facilitates intricate cuts, i.e., arounds bends and corners.

As described herein, the user selects the first cutting mode or the second cutting mode by depressing the cam selector 326 and sliding the cam selector engagement arm 338 relative to the cam selector 326 until either the first detent 350 or the second detent 352 is engaged with the cam selector 326. To remove the blade assembly 328, the user depresses and holds the cam selector 326 while sliding the blade assembly 328 linearly out of the metal snips 300 as depicted in FIG. 10. To insert a blade assembly, the process is reversed. As such, the user may quickly, and easily, remove a right-hand blade assembly 328 and replace it with a left-hand blade assembly 380. This switching between interchangeable right-hand and left-hand blade assemblies 328, 380 further facilitates the shaping of a metal workpiece. A single set of metal snips 300 are used but may function as right-handed or left-handed cutters.

Referring now to FIG. 12-FIG. 19, another embodiment of a cutting head 1222 for use in a pair of metal snips is illustrated. For example, the cutting head 1222 may be partially disposed within, and extend from, the 112 cutting head portion of the metal snips 100 depicted in FIG. 1 and FIG. 2—in lieu of the cutting head 122. Further, the cutting head 1222 may be partially disposed within, and extend from, the cutting head portion 314 of the metal snips depicted in FIG. 3-FIG. 11—in lieu of the cutting head 322.

Figure 12:
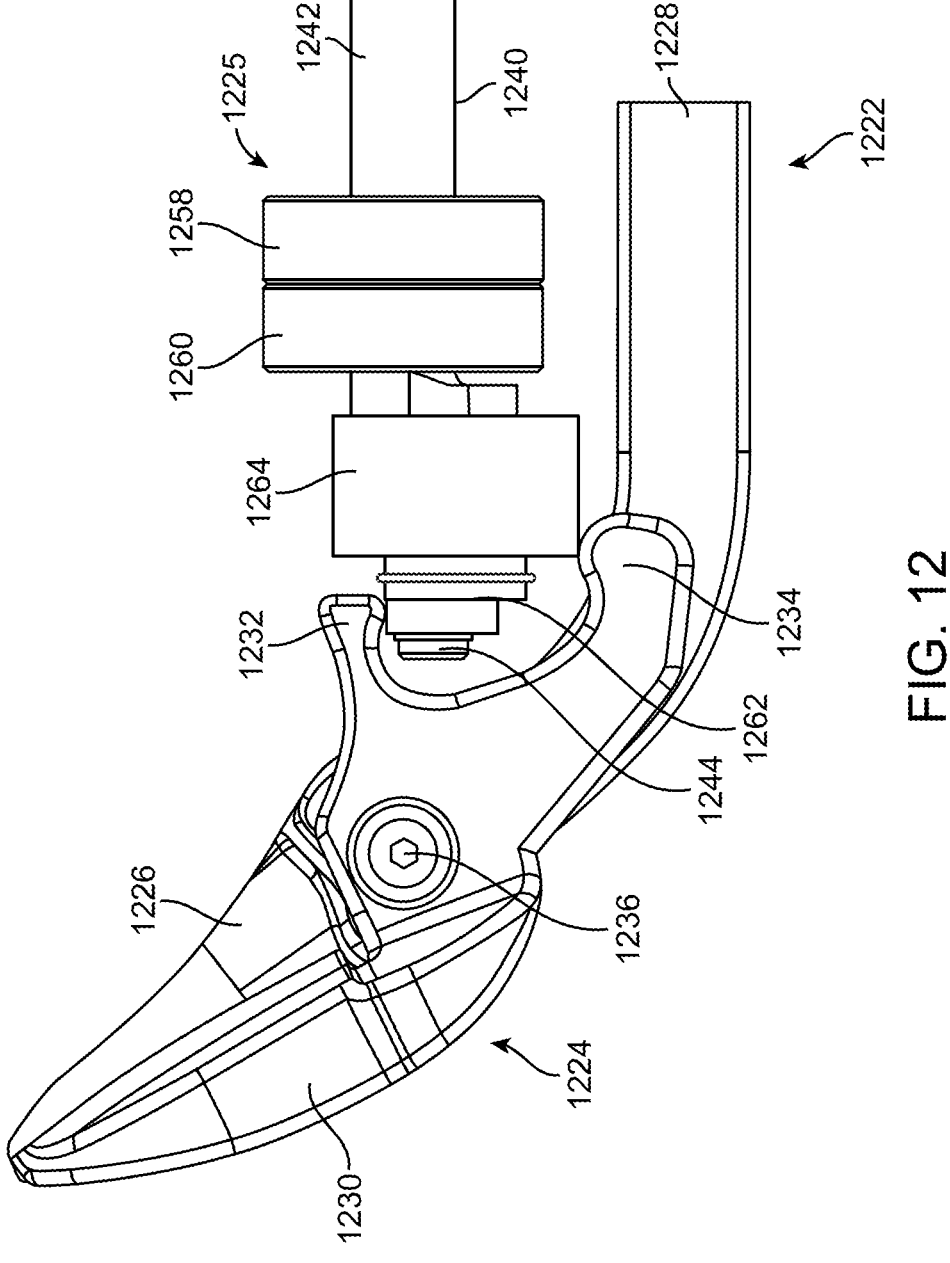
FIG. 12 is a side view of a cutting head for metal snips in accordance with another embodiment of the present disclosure.
Figure 13:
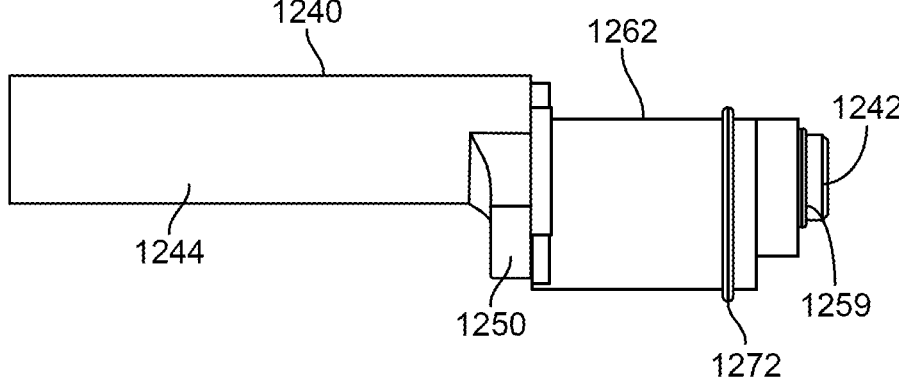
FIG. 13 is a side view of an eccentric drive assembly for the cutting head of FIG. 12 in accordance with an embodiment of the present disclosure.

As illustrated in FIG. 12, the cutting head 1222 may include a blade assembly 1224 and an eccentric drive assembly 1225. The eccentric drive assembly 1225 is coupled to a gear box output shaft that extends from a motor portion of a housing of the metal snips.

FIG. 12 shows that the blade assembly 1224 includes a fixed, or non-rotating upper blade 1226 that has an extension 1228 extending from the upper blade 1226 that is mounted within the cutting head portion of metal snips in order to maintain the upper blade 1226 in a fixed position. It is to be understood that the fixed, non-rotating upper blade 1226 does not rotate. The blade assembly 1224 also includes a rotating lower blade 1230 that includes an upper cam follower arm 1232 and a lower cam follower arm 1234 extending therefrom. As described in greater detail below, the rotating lower blade 1230 rotates about a pivot 1236 and is driven by the eccentric drive assembly 1225, in a cutting motion, as described in greater detail below.

Figure 14:
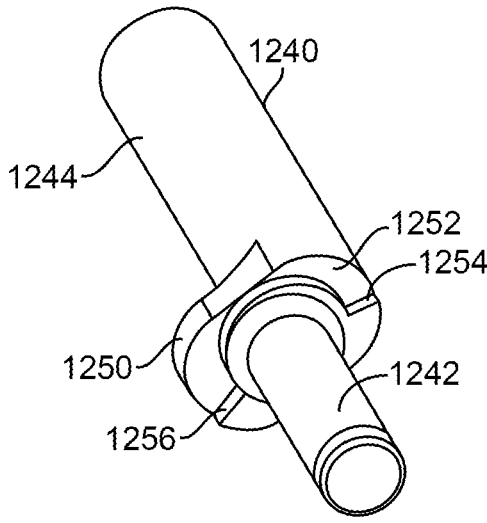
FIG. 14 is a perspective view of an eccentric drive shaft for the eccentric drive assembly of FIG. 13 in accordance with an embodiment of the present disclosure.

As shown, the eccentric drive assembly 1225 includes an eccentric drive shaft 1240 that includes an input shaft portion 1242 and an output shaft portion 1244. The output shaft portion 1244 of the eccentric drive shaft 1240 is offset from the input shaft portion 1242. In other words, the output shaft portion 1244 is not aligned along the same axis as the input shaft portion 1242 of the eccentric drive shaft 1240. Specifically, as indicated in FIG. 15, a longitudinal axis 1246 of the output shaft portion 1244 is spaced apart, or offset, from a longitudinal axis 1248 of the input shaft portion 1242 by a distance D. The eccentric drive shaft 1240 further includes a central collar 1250 extending radially outward from the eccentric drive shaft 1240 between the input shaft portion 1242 and output shaft portion 1244 of the eccentric drive shaft 1240. As best shown in FIG. 14, the central collar 1250 is formed with a peripheral slot 1252 partially around the central collar 1250 to form a first tab stop 1254 and a second tab stop 1256. The output shaft portion 1244 of the eccentric drive shaft 1240 is formed with a slot 1257 near an end of the output shaft portion 1244 and the slot 1257 is configured to receive a retainer spring 1259.

Returning to FIG. 12, the eccentric drive assembly 1225 includes a first bearing 1258 and a second bearing 1260 installed on the input shaft portion 1242 of the eccentric drive shaft 1240. Further, an eccentric shifter 1262 is rotatably installed on the output shaft portion 1244 of the eccentric drive shaft 1240. A cam 1264 is installed around the eccentric shifter 1262. FIG. 16 and FIG. 17 show that the eccentric shifter 1262 includes a first portion 1266 having a first diameter d1 and a second portion 1268 having a second diameter d2. As shown, d2 is less than d1. For example, d2 is approximately 80% of d1. As shown in FIG. 12, the retainer spring 1259 on the output shaft portion 1244 of the eccentric drive shaft 1240 is configured to retain the eccentric shifter 1262 on the output shaft portion 1244 of the eccentric drive shaft 1240 while allowing the eccentric shifter 1262 to rotate on the eccentric drive shaft 1240. The first portion 1266 of the eccentric shifter 1262 is configured to receive the cam 1264 therearound and includes a peripheral groove 1270 with a retainer spring 1272 installed therein to prevent the cam 1264 from disengaging from the eccentric shifter 1262.

FIG. 16 further shows that the eccentric shifter 1262 is formed with a longitudinal bore 1274 along the length of the eccentric shifter 1262 through the first portion 1266 of the eccentric shifter 1262 and the second portion 1268 of the eccentric shifter 1262. The inner diameter of the longitudinal bore 1274 of the eccentric shifter 1262 is slightly larger than the outer diameter of the output shaft portion 1244 of the eccentric drive shaft 1240 to allow the eccentric shifter 1262 to rotate freely on the eccentric drive shaft 1240, as described below. Further, the center of the longitudinal bore 1274 is offset from the longitudinal axis of the eccentric shifter 1262. As further shown in FIG. 16 and FIG. 17, the eccentric shifter 1262 further includes a tab 1276 extending from an end face 1278 of the eccentric shifter 1262. During operation, the tab 1276 selectively engages with the tab stops 1254, 1256 formed on the central collar 1250 of the eccentric drive shaft 1240.

Returning to FIG. 12, the upper cam follower arm 1232 of the rotating lower blade 1230 is engaged with an outer surface of the second portion 1268 of the eccentric shifter 1262 while the lower cam follower arm 1234 of the rotating lower blade 1230 is engaged with an outer surface of the cam 1264 installed on the first portion 1266 of the eccentric shifter 1262. While the eccentric drive shaft 1240 of the eccentric drive assembly 1225 rotates, the eccentric shifter 1262 rotates therewith. The cam 1264 pushes the lower cam follower arm 1234 of the rotating lower blade 1230 in order to push the rotating lower blade 1230 toward the fixed upper blade 1226. The second portion 1268 of the eccentric shifter 1262 pushes the upper cam follower arm 1232 of the rotating lower blade 1230 in order to push the rotating lower blade 1230 away from fixed upper blade 1226 to establish a full cutting stroke, or cutting motion.

Figure 18:
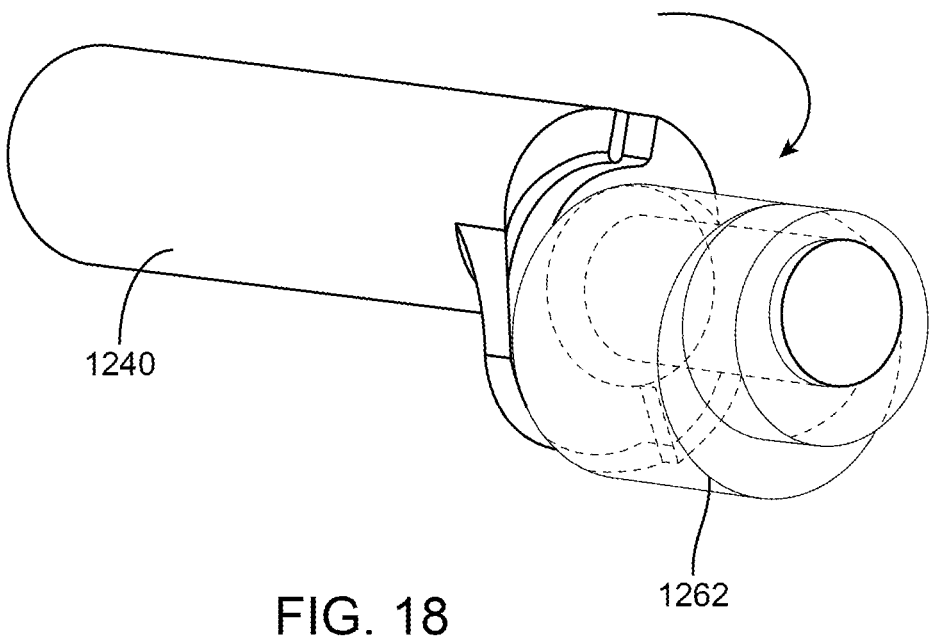
FIG. 18 is a first perspective view of the eccentric drive assembly for the eccentric drive assembly of FIG. 13 in accordance with an embodiment of the present disclosure.
Figure 19:
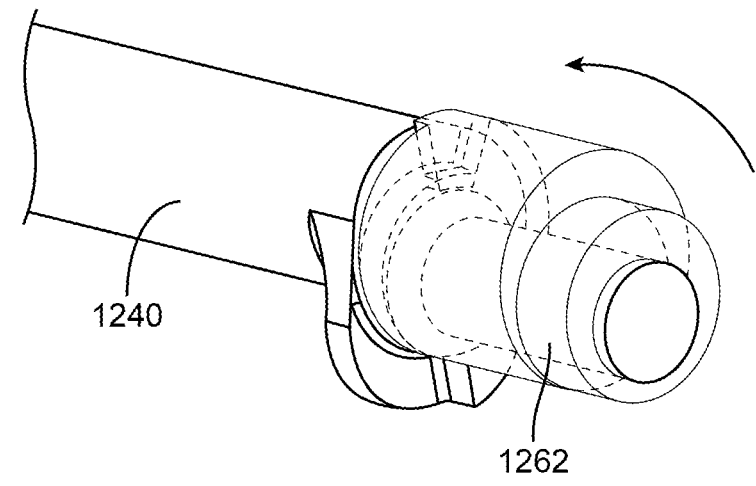
FIG. 19 is a second perspective view of the eccentric drive assembly for the eccentric drive assembly of FIG. 13 in accordance with an embodiment of the present disclosure.

Referring now to FIG. 18 and FIG. 19, as the eccentric drive shaft 1240 rotates in a first direction, e.g., clockwise, the tab 1276 is engaged with the second tab stop 1256 of the central collar 1250 of the eccentric drive shaft 1240. To change the cutting stroke length of the blade assembly 1224 of the cutting head 1222, to location of the center of the cam 1264 relative to the output shaft portion 1244 of the eccentric drive shaft 1240 is changed. In other words, the eccentric drive distance is changed while the size of the cam 1264 remains the same. This has the effect of changing the length of the cutting stroke.

In order to change the eccentric drive distance of the eccentric shifter 1262 between a first eccentric drive distance and a second eccentric drive distance that is different from the first eccentric drive distance, the direction of rotation of the eccentric drive shaft 1240 is changed, as indicated in FIG. 19, to allow the eccentric shifter 1262 to rotate on the eccentric drive shaft 1240 until the tab 1276 on the eccentric shifter 1262 engages with the first tab stop 1254 of the central collar 1250 on the eccentric drive shaft 1240 causing the eccentric drive distance to decrease and thereby, decreasing the cutting stroke length. When the tab 1276 on the eccentric shifter 1262 is engaged with the first tab stop 1254 of the central collar 1250 of the eccentric drive shaft 1240, as shown in FIG. 19, the cutting stroke length is approximately one millimeter (1 mm). When the direction of rotation of the eccentric drive shaft 1240 is in the direction shown in FIG. 18 and the tab 1276 on the eccentric shifter 1262 is engaged with the second tab stop 1256 of the central collar 1250 of the eccentric drive shaft 1240 and the cutting stroke length is approximately six millimeters (6 mm). Accordingly, by changing the direction of rotation of an output shaft of the motor within the metal snips that is operably coupled to the eccentric drive shaft 1240, the cutting stroke length of the cutting head 1222 can be selectively changed between the relatively small (1 mm) cutting stroke length and the relatively large (6 mm) cutting stroke length. As such, the metal snips may be optimized for cutting materials having different thicknesses, or gauges.

Figure 20:
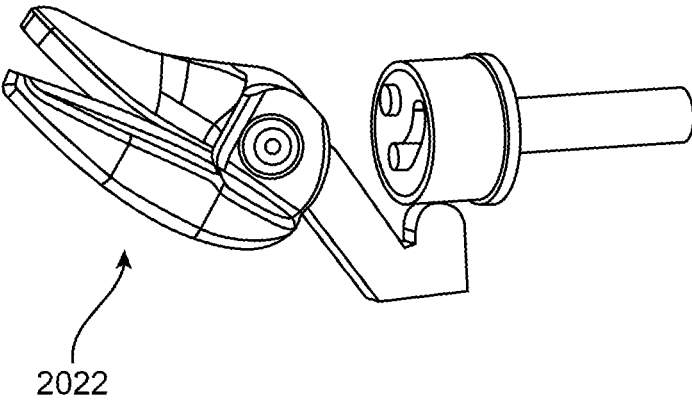
FIG. 20 is a perspective view of a cutting head for metal snips in accordance with another embodiment of the present disclosure.
Figure 21:
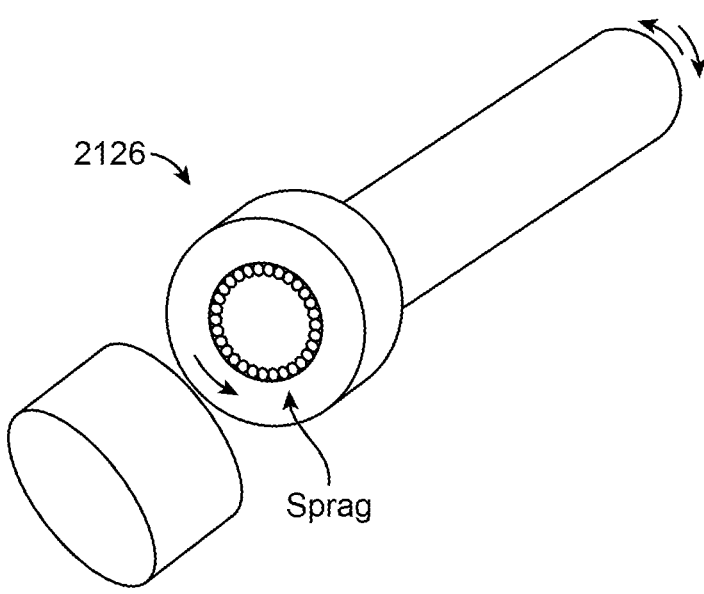
FIG. 21 is a perspective view of a drive assembly for metal snips in accordance with another embodiment of the present disclosure.
Figure 22:
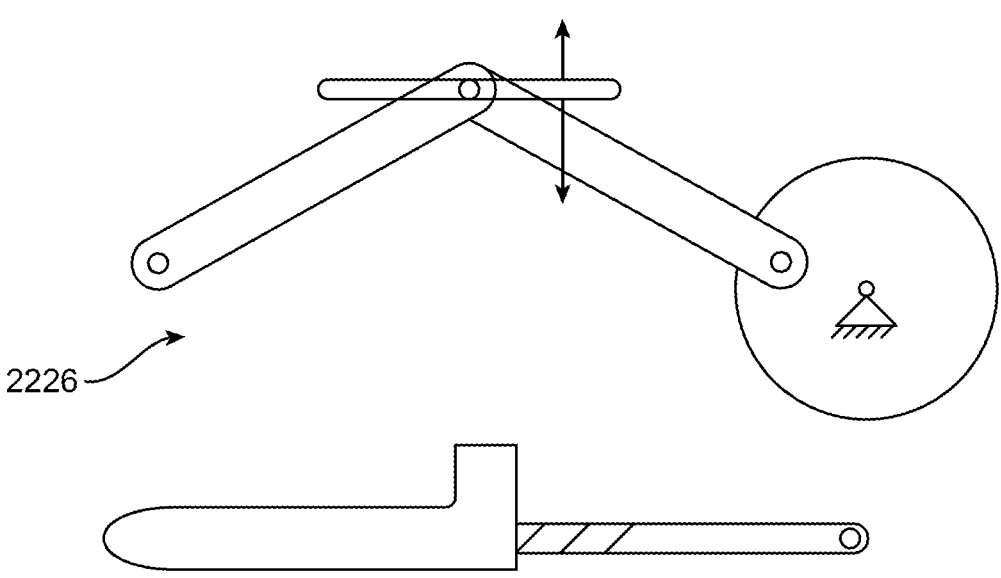
FIG. 22 is a side view of a drive assembly for metal snips in accordance with another embodiment of the present disclosure.
Figure 23:
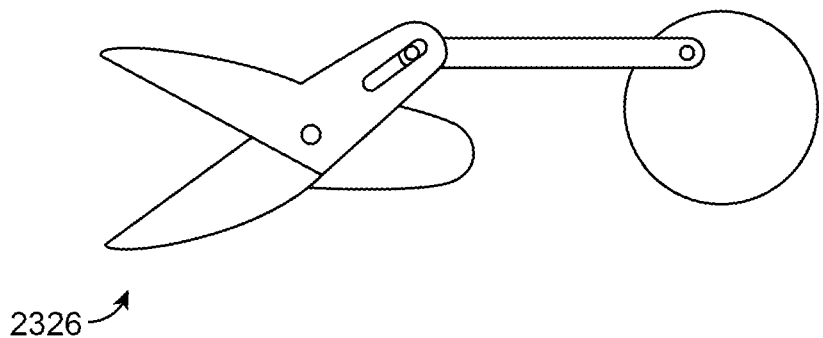
FIG. 23 is a side view of a drive assembly for metal snips in accordance with another embodiment of the present disclosure.
Figure 24:
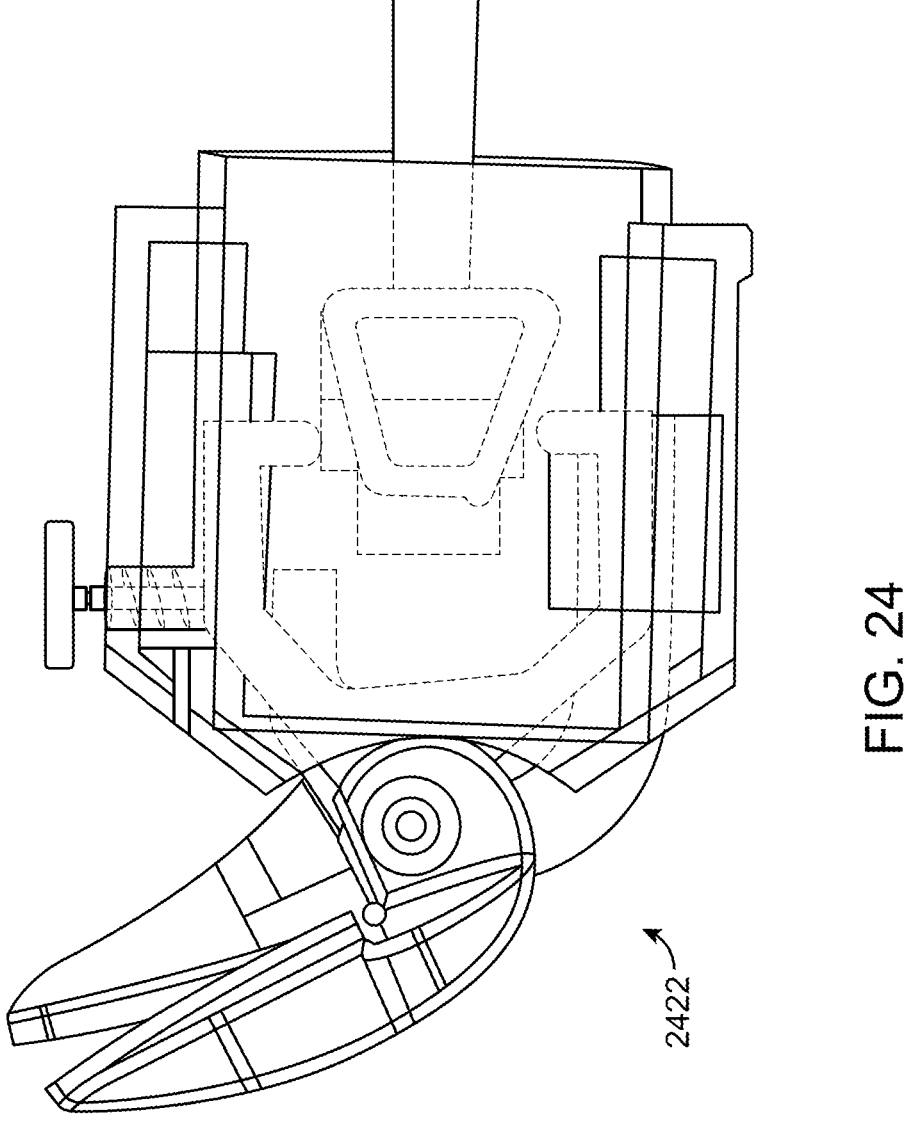
FIG. 24 is a side view of a drive assembly for metal snips in accordance with another embodiment of the present disclosure.

FIG. 20 illustrates a cutting head 2022 that utilizes offset pins and slots to control the eccentric location of a cam attached thereto. FIG. 21 shows a drive assembly 2126 that utilizes sprag gears that will engage and drive separate cams-depending on the rotation of the drive shaft. FIG. 22 illustrates a drive assembly 2226 that utilizes an adjustable length linkage to change the stroke length of a blade assembly attached thereto. FIG. 23 depicts an adjustable pin/slot arrangement that is used to adjust the cutting stroke length. Finally, FIG. 24 shows a cutting head 2422, that uses a frustoconical shaped cam that is moved along its longitudinal axis to change the cutting stroke length.

Figure 25:
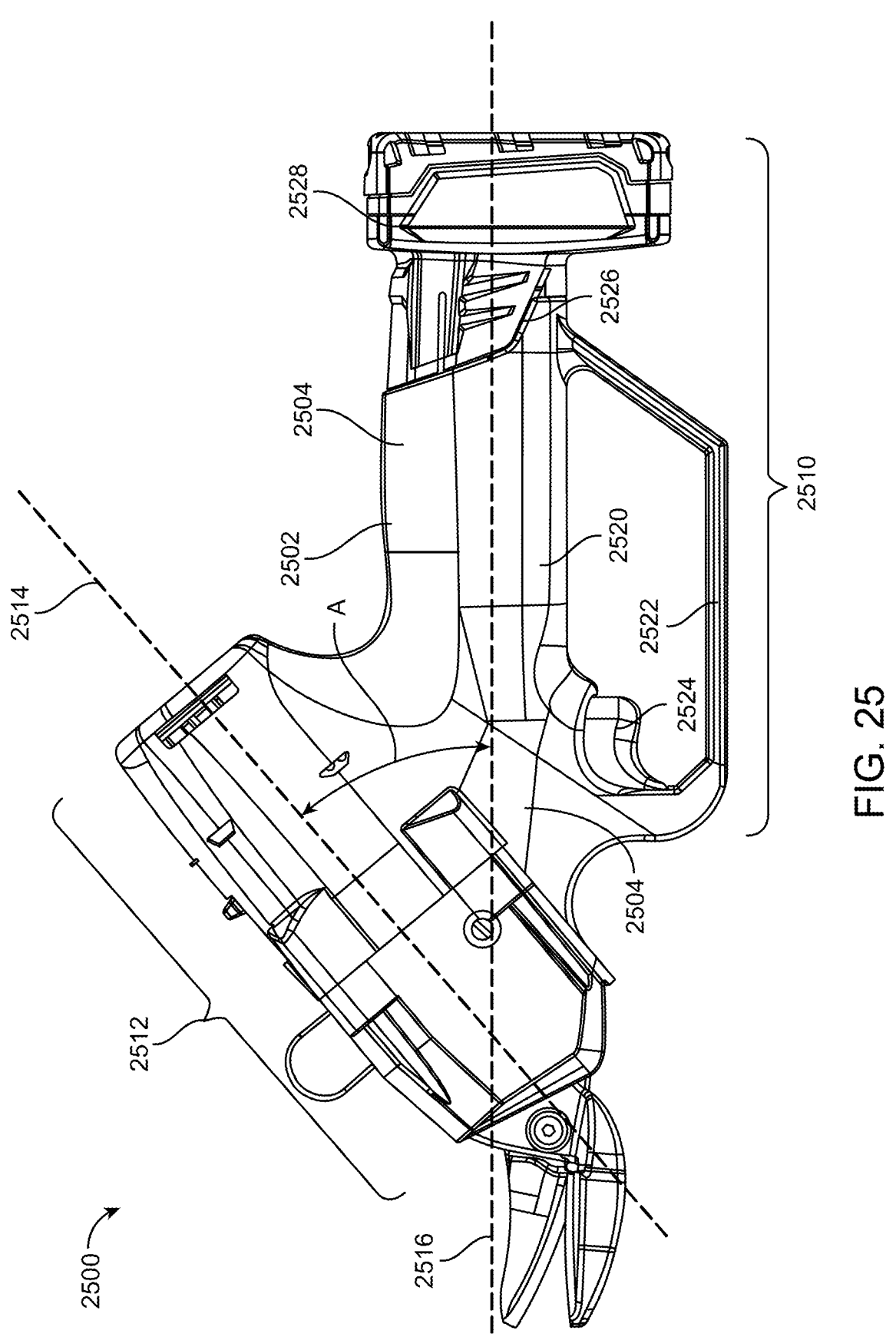
FIG. 25 is a left side view of metal snips in accordance with a third embodiment of the present disclosure.
Figure 26:
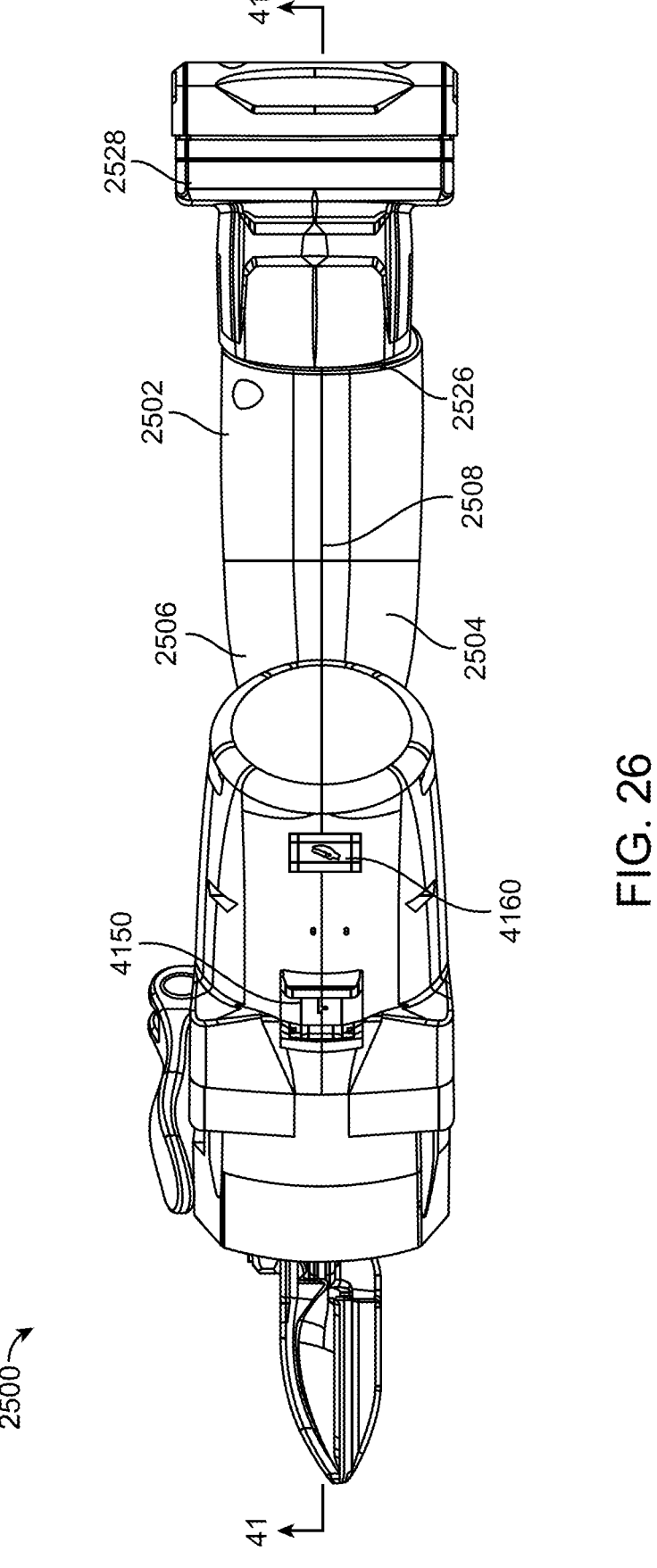
FIG. 26 is a top view of the third metal snips according to an embodiment of the present disclosure.
Figure 27:
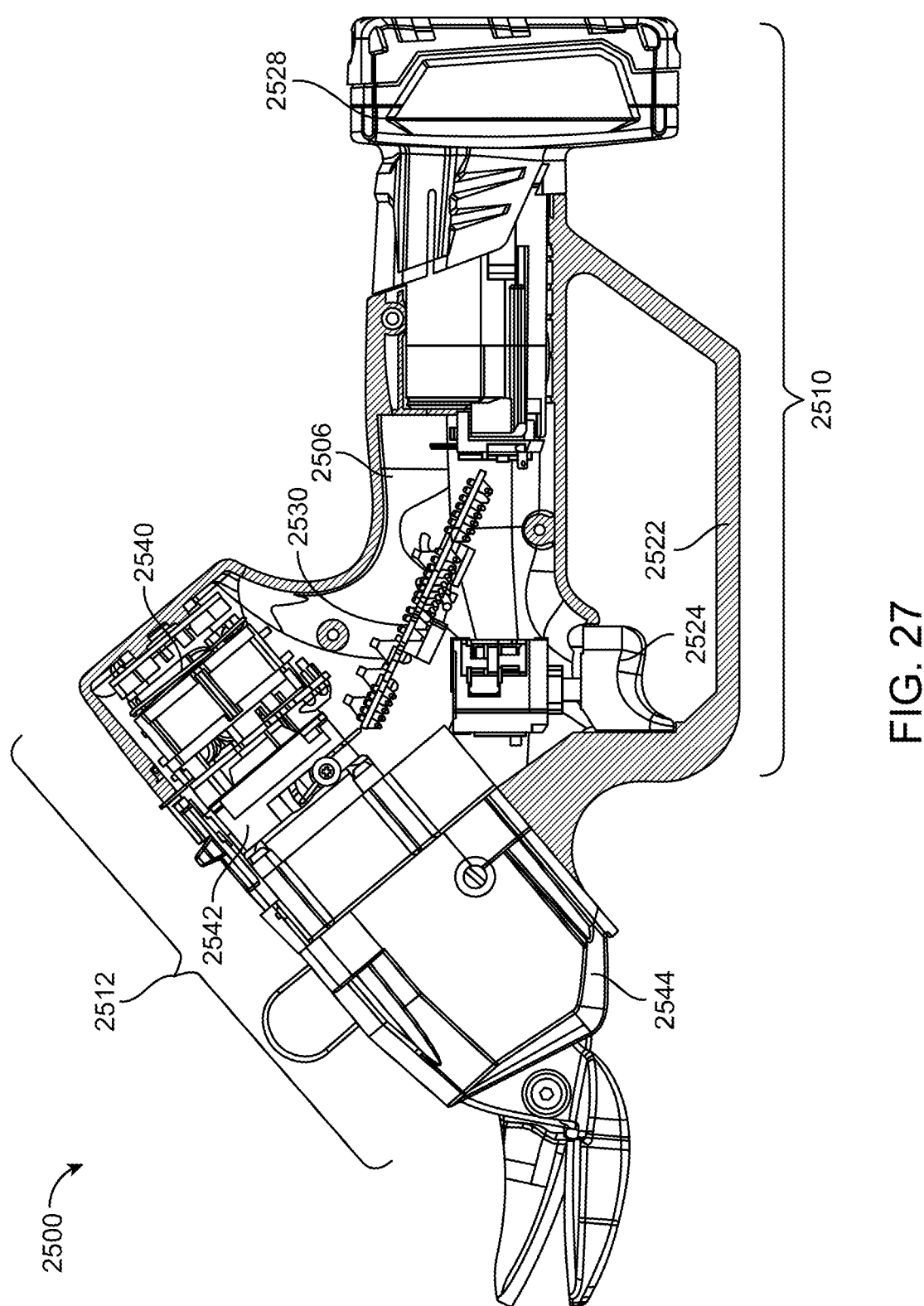
FIG. 27 is a left side view of the third metal snips according to an embodiment of the present disclosure with a portion of the housing removed.

Referring now to FIGS. 25-27, a third embodiment of metal snips is illustrated and is generally designated 2500. As illustrated in FIG. 25, the metal snips 2500 include a housing 2502 that includes a first housing side 2504 and a second housing side 2506. As shown in FIG. 25, the housing sides 2504, 2506 meet to form an interface 2508 between the housing sides 2504, 2506. It is to be understood that the housing sides 2504, 2506 are attached, or otherwise affixed, to each other via a plurality of fasteners, e.g., screws, that are not shown in the figures. Alternatively, the housing sides 2504, 2506 are affixed to each other via an adhesive or via a plastic welding operation.

As depicted in FIGS. 25-27, the housing 2502 defines a handle portion 2510 and a cutting head portion 2512. The handle portion 2510 defines a handle axis 2514 and the cutting head portion 2512 defines a cutting head axis 2516. As illustrated the cutting head axis 2516 forms an angle A with respect to the handle axis 2514. In a particular aspect, A is greater than or equal to twenty degrees (20°), such as greater than equal twenty-five degrees (25°), greater than equal thirty degrees (30°), greater than equal thirty-five degrees (35°), or greater than equal forty degrees (40°). In another aspect, less than or equal to sixty degrees (60°), such as less than equal fifty-five degrees (55°), less than equal fifty degrees (50°), or less than equal forty-five degrees (45°). It is to be understood that A can be within a range between, an including, any of the minimum and maximum values of A described herein.

FIGS. 25-27 further show that the handle portion 2510 of the metal snips 2500 includes a grip 2520 and a knuckle guard 2522. A trigger 2524 extends from the housing 2502 into the area bound by the knuckle guard 2522. The handle portion 2510 includes a battery receptacle 2526 that is configured to receive a removable battery pack 2528. FIG. 27 shows that a circuit board 2530 is disposed within the handle portion 2510 and is electrically coupled to the battery pack 2528 when the battery pack 2528 is installed within the battery receptacle 2526. The circuit board 2530 includes the electronics that control the operation of the metal snips 2500. The trigger 2524 is operably coupled to the circuit board 2530 and is actuatable to selectively and electrically connect the battery pack 2528 to a motor, described below, within the cutting head portion 2512.

As illustrated in FIG. 27, the cutting head portion 2512 includes a motor 2540 that is operably coupled to a gearbox 2542. In a particular aspect, the motor 2540 is a brushless direct current (BLDC) motor and is selectively powered by the battery pack 2528. FIG. 27 further shows that the gearbox 2542 is operably coupled to a cutting head 2544 that is partially disposed in, and extends partially from, the cutting head portion 2512 of the housing 2502.

Figure 28:
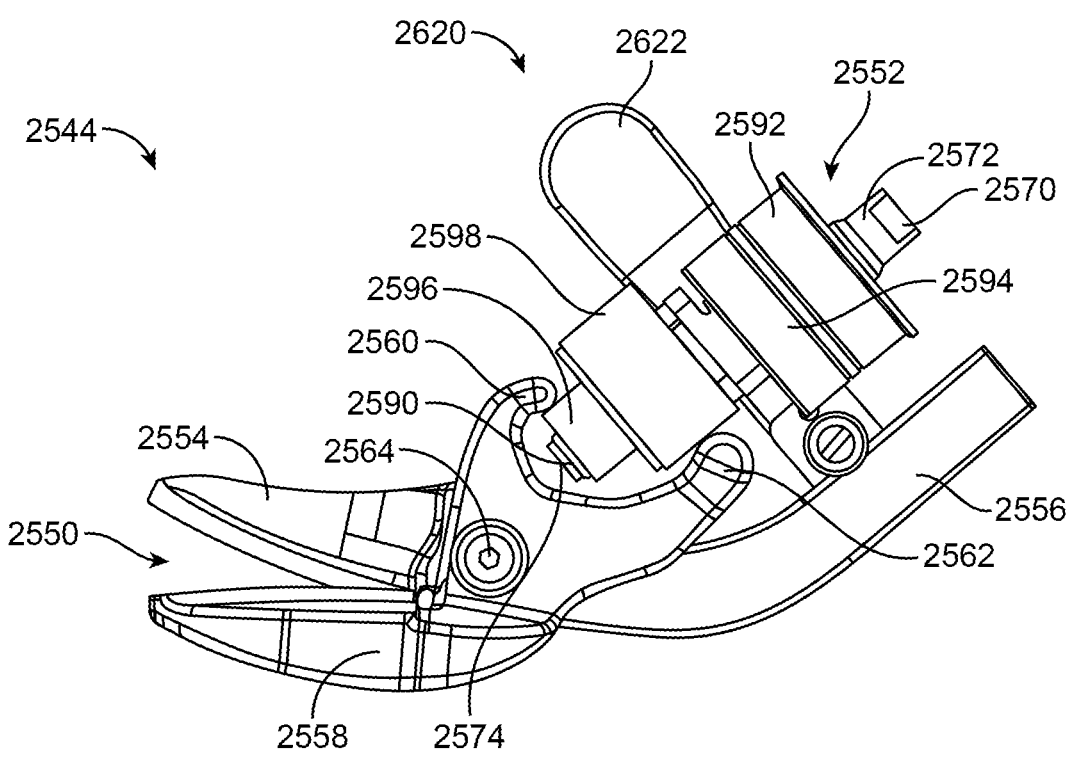
FIG. 28 is a left side view of a cutting head for the third metal snips according to an embodiment of the present disclosure.
Figure 29:
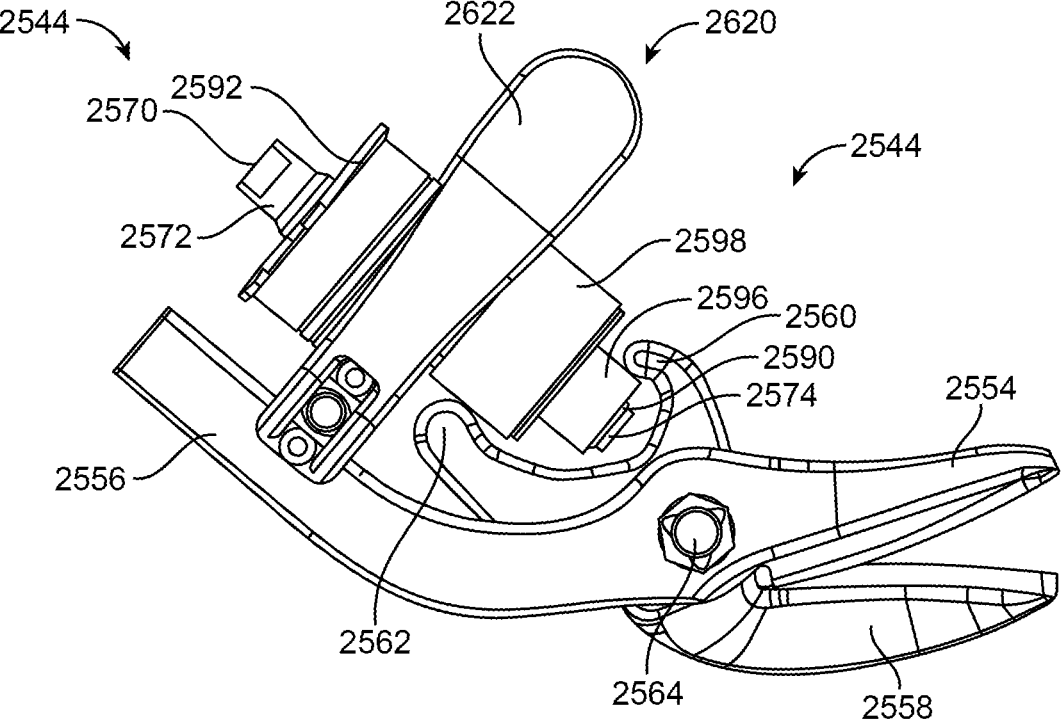
FIG. 29 is a right side view of the cutting head for the third metal snips according to an embodiment of the present disclosure.
Figures 30, 31:
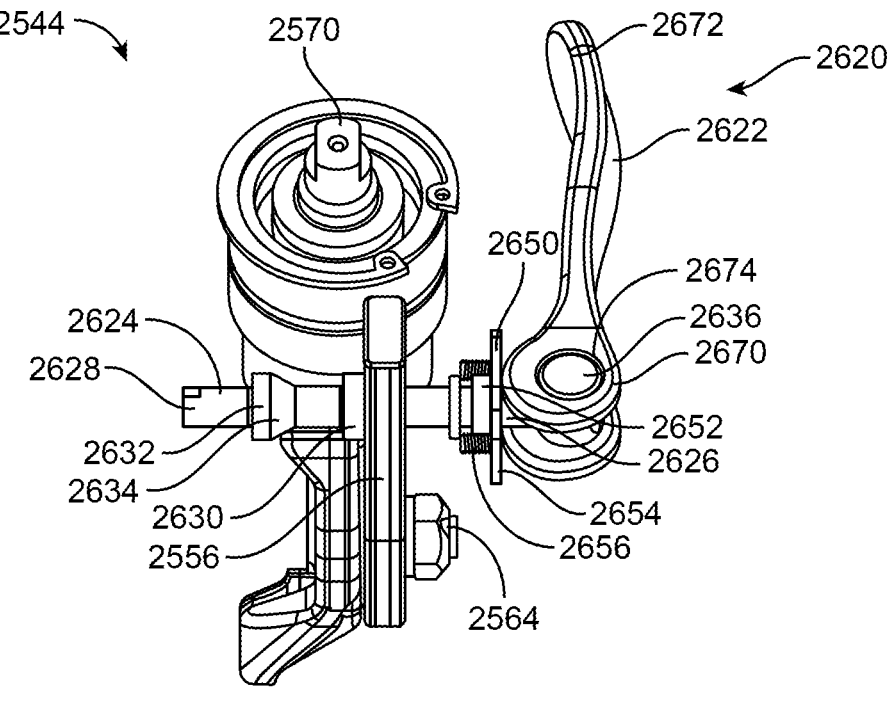
FIG. 30 is a rear view of the cutting head for the third metal snips according to an embodiment of the present disclosure.
FIG. 31 is a side view of an eccentric drive assembly for the cutting head of FIG. 28 in accordance with an embodiment of the present disclosure.

FIGS. 28-30 show that the blade assembly 2550 includes a fixed, or non-rotating upper blade 2554 that has an extension 2556 extending from the upper blade 2554 that is mounted within the cutting head portion 2512 of the metal snips 2500 in order to maintain the upper blade 2554 in a fixed position. It is to be understood that the fixed, non-rotating upper blade 2554 does not rotate. The blade assembly 2550 also includes a rotating lower blade 2558 that includes an upper cam follower arm 2560 and a lower cam follower arm 2562 extending therefrom. As described in greater detail below, the rotating lower blade 2558 rotates about a pivot 2564 and is driven by the eccentric drive assembly 2552, as described in greater detail below, to establish a cutting motion.

Figure 32:
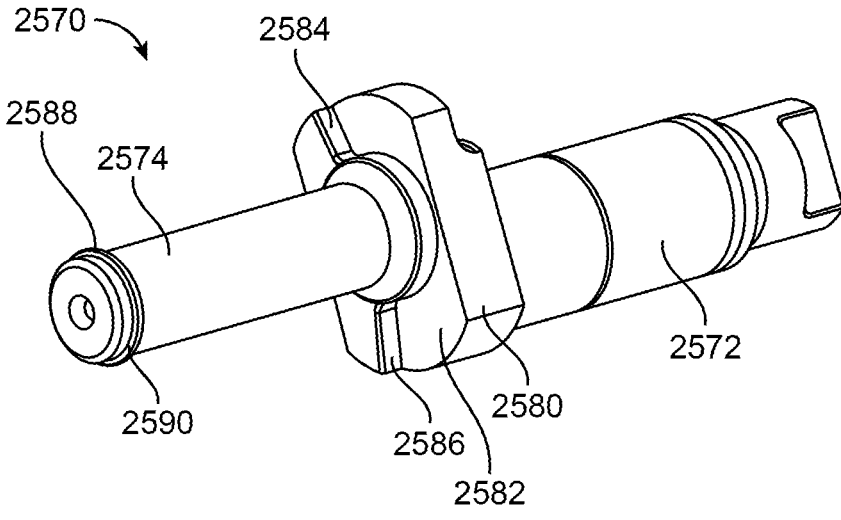
FIG. 32 is a perspective view of an eccentric drive shaft for the eccentric drive assembly of FIG. 31 in accordance with an embodiment of the present disclosure.
Figure 33:
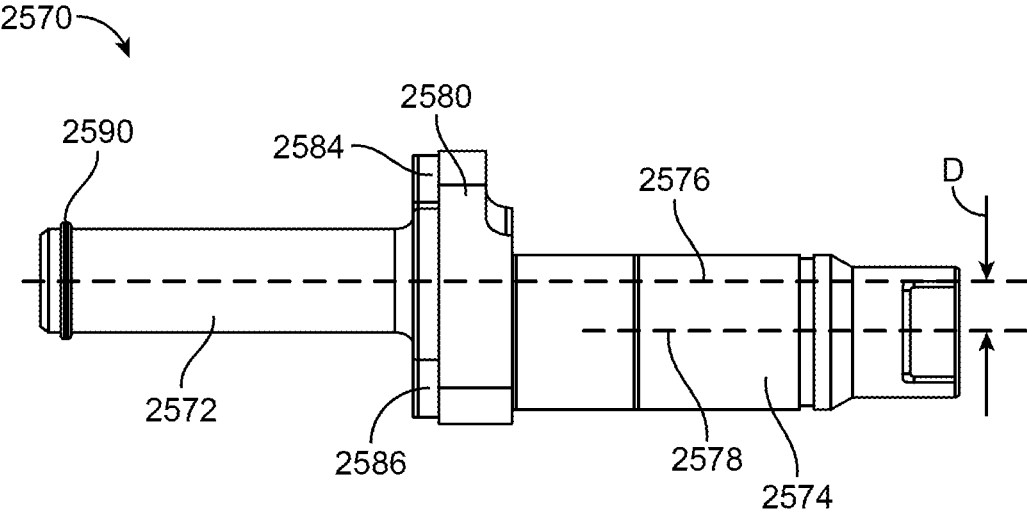
FIG. 33 is a side view of the eccentric drive shaft for the eccentric drive assembly of FIG. 31 in accordance with an embodiment of the present disclosure.

As shown, the eccentric drive assembly 2552 includes an eccentric drive shaft 2570 that includes an input shaft portion 2572 and an output shaft portion 2574. The output shaft portion 2574 of the eccentric drive shaft 2570 is offset from the input shaft portion 2572. In other words, the output shaft portion 2574 is not aligned along the same axis as the input shaft portion 2572 of the eccentric drive shaft 2570. Specifically, as indicated in FIGS. 32 and 33, a longitudinal axis 2576 of the output shaft portion 2574 is spaced apart, or offset, from a longitudinal axis 2578 of the input shaft portion 2572 by a distance D. The eccentric drive shaft 2570 further includes a central collar 2580 extending radially outward from the eccentric drive shaft 2570 between the input shaft portion 2572 and output shaft portion 2574 of the eccentric drive shaft 2570. As best shown in FIGS. 32 and 33, the central collar 2580 is formed with a peripheral slot 2582 partially around the central collar 2580 to form a first tab stop 2584 and a second tab stop 2586. The output shaft portion 2574 of the eccentric drive shaft 2570 is formed with a slot 2588 near an end of the output shaft portion 2574 and the slot 2588 is configured to receive a retainer spring 2590.

Figure 34:
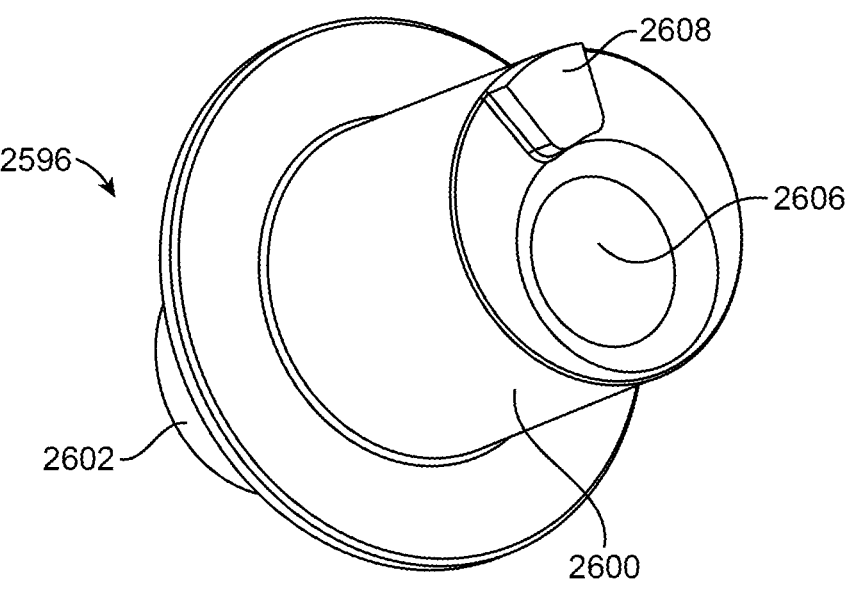
FIG. 34 is a perspective view of an eccentric shifter for the eccentric drive assembly of FIG. 31 in accordance with an embodiment of the present disclosure.
Figure 35:
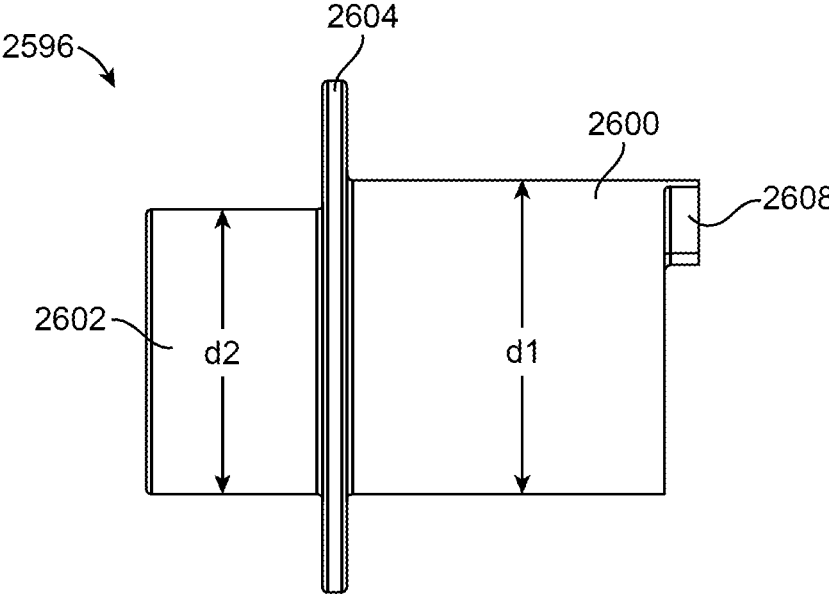
FIG. 35 is a side view if the eccentric shifter of FIG. 34 in accordance with an embodiment of the present disclosure.

Returning to FIGS. 28-30, the eccentric drive assembly 2552 includes a first bearing 2592 and a second bearing 2594 installed on the input shaft portion 2572 of the eccentric drive shaft 2570. Further, an eccentric shifter 2596 is rotatably installed on the output shaft portion 2574 of the eccentric drive shaft 2570. A cam 2598 is installed around the eccentric shifter 2596. FIG. 34 and FIG. 35 show that the eccentric shifter 2596 includes a first portion 2600 having a first outer diameter d1 and a second portion 2602 having a second outer diameter d2. As shown, d2 is less than d1. In a particular aspect, d2 is less than or equal to $0.950 \times d1$, such as less than or equal to $0.925 \times d1$, less than or equal to $0.900 \times d1$, or less than or equal to $0.875 \times d1$. In another aspect, d2 is greater than or equal to $0.750 \times d1$, such as greater than or equal to $0.775 \times d1$, greater than or equal to $0.800 \times d1$, greater than or equal to $0.825 \times d1$, or greater than or equal to $0.850 \times d1$. It is to be understood that d2 may be within a range between, and including, any of the maximum or minimum values of d2, described herein.

As shown in FIG. 31, the retainer spring 2590 on the output shaft portion 2574 of the eccentric drive shaft 2570 is configured to retain the eccentric shifter 2596 on the output shaft portion 2574 of the eccentric drive shaft 2570 while allowing the eccentric shifter 2596 to rotate on the eccentric drive shaft 2570. The first portion 2600 of the eccentric shifter 2596 is configured to receive the cam 2598 therearound and the eccentric shifter 2595 includes a flange 2604 extending radially outward between the first portion 2600 and the second portion 2602 to prevent the cam 2598 from disengaging from the eccentric shifter 2596 when the eccentric shifter 2596 is installed on the eccentric drive shaft 2570.

FIG. 34 further shows that the eccentric shifter 2596 is formed with a longitudinal bore 2606 along the length of the eccentric shifter 2596 through the first portion 2600 of the eccentric shifter 2596 and the second portion 2602 of the eccentric shifter 2596. The inner diameter of the longitudinal bore 2606 of the eccentric shifter 2596 is slightly larger than the outer diameter of the output shaft portion 2574 of the eccentric drive shaft 2570 to allow the eccentric shifter 2596 to rotate freely on the eccentric drive shaft 2570, as described below. Further, the center of the longitudinal bore 2606 is offset from the longitudinal axis of the eccentric shifter 2596. As further shown in FIG. 34 and FIG. 35, the eccentric shifter 2596 further includes a tab 2608 extending from an end face 2612 of the eccentric shifter 2596. During operation, the tab 2608 selectively engages with the tab stops 2584, 2586 formed on the central collar 2580 of the eccentric drive shaft 2570.

Returning to FIGS. 28 and 29, the upper cam follower arm 2560 of the rotating lower blade 2558 is engaged with an outer surface of the second portion 2602 of the eccentric shifter 2596 while the lower cam follower arm 2562 of the rotating lower blade 2558 is engaged with an outer surface of the cam 2598 installed on the first portion 2600 of the eccentric shifter 2596. While the eccentric drive shaft 2570 of the eccentric drive assembly 2552 rotates, the eccentric shifter 2596 rotates therewith. The cam 2598 pushes the lower cam follower arm 2562 of the rotating lower blade 2558 in order to push the rotating lower blade 2558 toward the fixed upper blade 2554. The second portion 2602 of the eccentric shifter 2596 pushes the upper cam follower arm 2560 of the rotating lower blade 2558 in order to push the rotating lower blade 2558 away from fixed upper blade 2554 to establish a full cutting stroke, or cutting motion.

As the eccentric drive shaft 2570 rotates in a first direction, e.g., clockwise, the tab 2608 is engaged with the second tab stop 2586 of the central collar 2580 of the eccentric drive shaft 2570. To change the cutting stroke length of the blade assembly 2550 of the cutting head 2544, to location of the center of the cam 2598 relative to the output shaft portion 2574 of the eccentric drive shaft 124 is changed. In other words, the eccentric drive distance is changed while the size of the cam 2598 remains the same. This has the effect of changing the length of the cutting stroke.

In order to change the eccentric drive distance of the eccentric shifter 2596 between a first eccentric drive distance and a second eccentric drive distance, the direction of rotation of the eccentric drive shaft 2570 is changed to allow the eccentric shifter 2596 to rotate on the eccentric drive shaft 2570 until the tab 2608 on the eccentric shifter 2596 engages with the first tab stop 2584 of the central collar 2580 on the eccentric drive shaft 2570 causing the eccentric drive distance to decrease and thereby, decreasing the cutting stroke length. When the tab 2608 on the eccentric shifter 2596 is engaged with the first tab stop 2584 of the central collar 2580 of the eccentric drive shaft 2570 the cutting stroke length is approximately one millimeter (1 mm). When the direction of rotation of the eccentric drive shaft 2570 is in the opposite direction and the tab 2608 on the eccentric shifter 2596 is engaged with the second tab stop 2586 of the central collar 2580 of the eccentric drive shaft 2570 and the cutting stroke length is approximately six millimeters (6 mm). Accordingly, by changing the direction of rotation of an output shaft of the motor within the metal snips that is operably coupled to the eccentric drive shaft 2570, the cutting stroke length of the cutting head 2544 can be selectively changed between the relatively small (1 mm) cutting stroke length and the relatively large (6 mm) cutting stroke length. As such, the metal snips may be optimized for cutting materials having different thicknesses, or gauges.

Referring again to FIGS. 28-30, the cutting head 2544 further includes a blade release mechanism 2620 adjacent the blade assembly 2550. The blade release mechanism 2620 includes a handle 2622 rotatably attached to an adjustable plunger 2624. As best illustrated in FIG. 30, the adjustable plunger 2624 includes a proximal end 2626 and a distal end 2628. A first locking flange 2630 and a second locking flange 2632 are formed on the adjustable plunger 2624 and extend radially outward from the plunger 2624. Each locking flange 2630, 2632 includes a beveled surface 2634 that is configured to engage the extension 2556 of the fixed the upper blade 2554 to lock the blade assembly 2550 within the cutting head 2544. As shown, the adjustable plunger 2624 also includes a hinge post 2636 threadably engaged with the proximal end 2626 of the adjustable plunger 2624. The cutting head 2544 further includes a plug 2650 and the proximal end 2626 of the adjustable plunger 2624 extends through the plug 2650. The plug 2650 includes a central hub 2652 and a flange 2654 extending radially outward from the central hub 2652. A pair of fasteners 2656 extend through the flange 2654 to secure the plug 2650 in place on the housing 2502 of the metal snips 2500.

FIG. 30 further indicates that the handle 2622 includes a proximal end 2670 and a distal end 2672. The proximal end 2670 is formed as a cam and includes a hole 2674 that extends therethrough. When assembled, the hinge post 2636 extends through the hole 2674 in the proximal end 2670 of the handle 2622 and is threaded onto the proximal end 2626 of the adjustable plunger 2624.

Figure 36:
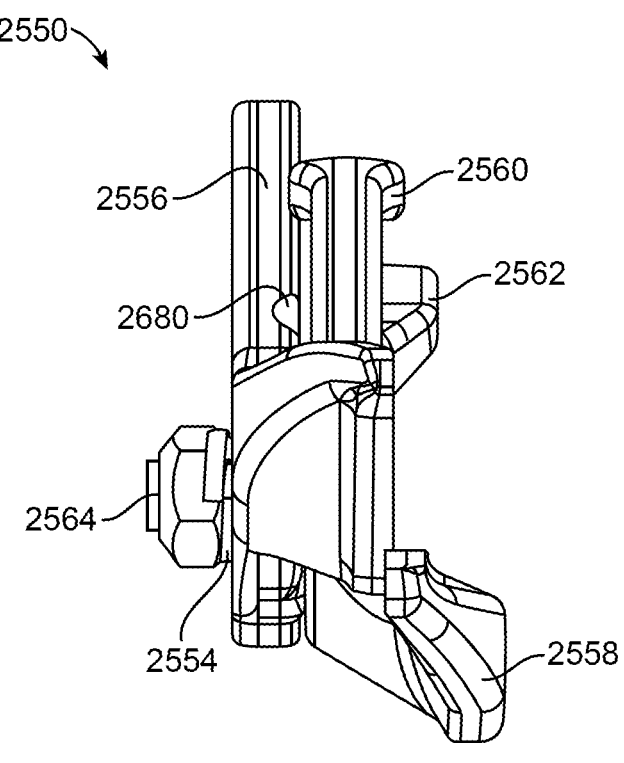
FIG. 36 is a front view of a right-handed blade assembly in accordance with an embodiment of the present disclosure.

Referring to FIG. 36, the extension 2556 of the fixed upper blade 2554 of the blade assembly 2550 includes a rounded notch 2680 that is configured to engage the first locking flange 2630, as described in detail below.

Figure 37:
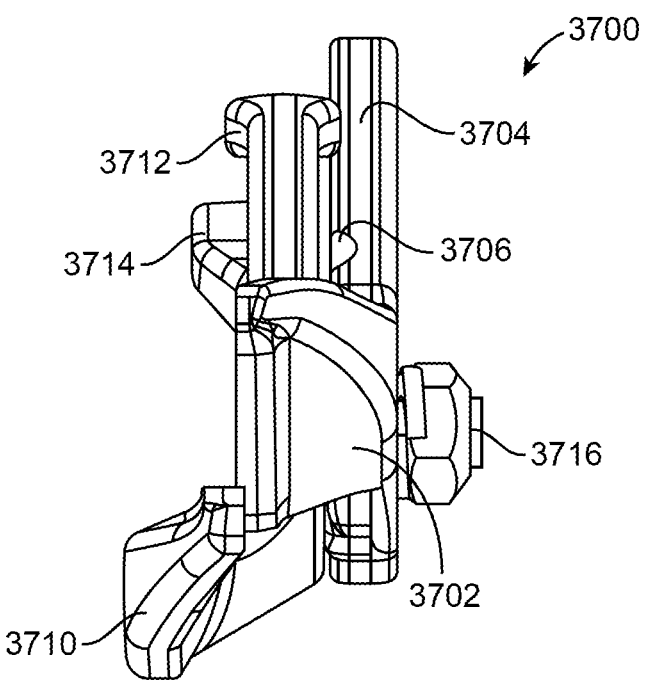
FIG. 37 is a front view of a left-handed blade assembly in accordance with an embodiment of the present disclosure.

FIG. 37 illustrates another blade assembly 3700. The blade assembly 3700 shown in FIG. 37 is a left-handed blade assembly 3700 that is a mirror image, or copy, of the blade assembly 2550. Accordingly, the metal snips 2500 includes a first blade assembly 2550 and a second blade assembly 3700 that is substantially a mirror image of the first blade assembly 2550. The blade assembly 3700 includes a fixed, or non-rotating upper blade 3702 that has an extension 3704 extending from the upper blade 3702 that is mounted within the cutting head 2544 of the metal snips 2500 in order to maintain the upper blade 3702 in a fixed position. It is to be understood that the fixed, non-rotating upper blade 3702 does not rotate. The extension 3704 of the fixed upper blade 3702 of the blade assembly 3700 includes a rounded notch 3706 that is configured to engage the second locking flange 2632, as described in detail below. The blade assembly 3700 also includes a rotating lower blade 3710 that includes an upper cam follower arm 3712 and a lower cam follower arm 3714 extending therefrom. As described in greater detail below, the rotating lower blade 3710 rotates about a pivot 3716 and is driven by the eccentric drive assembly 2552 to establish a cutting motion.

Figure 38:
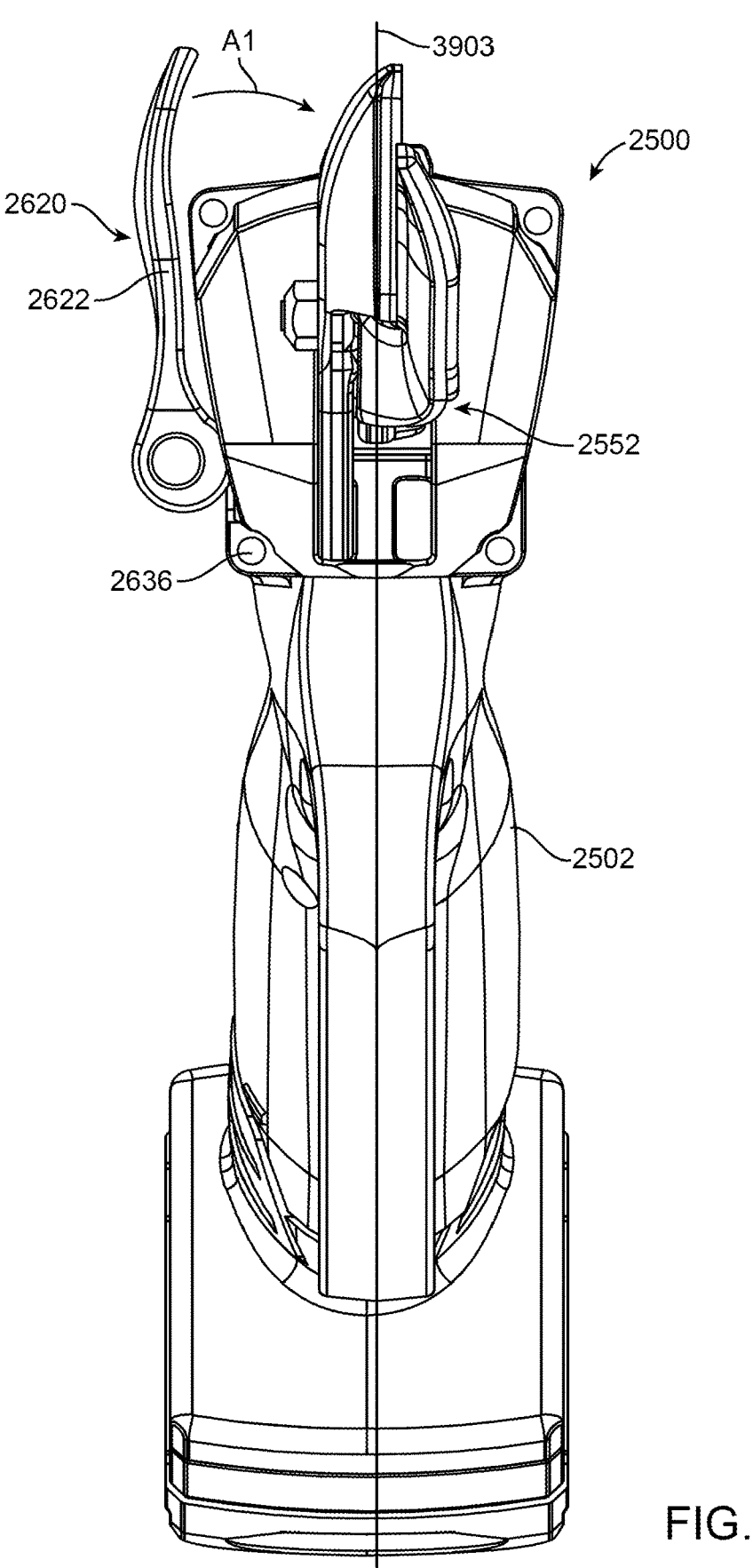
FIG. 38 is a front view of the third metal snips with the right-handed blade assembly installed therein in accordance with an embodiment of the present disclosure.
Figure 39:
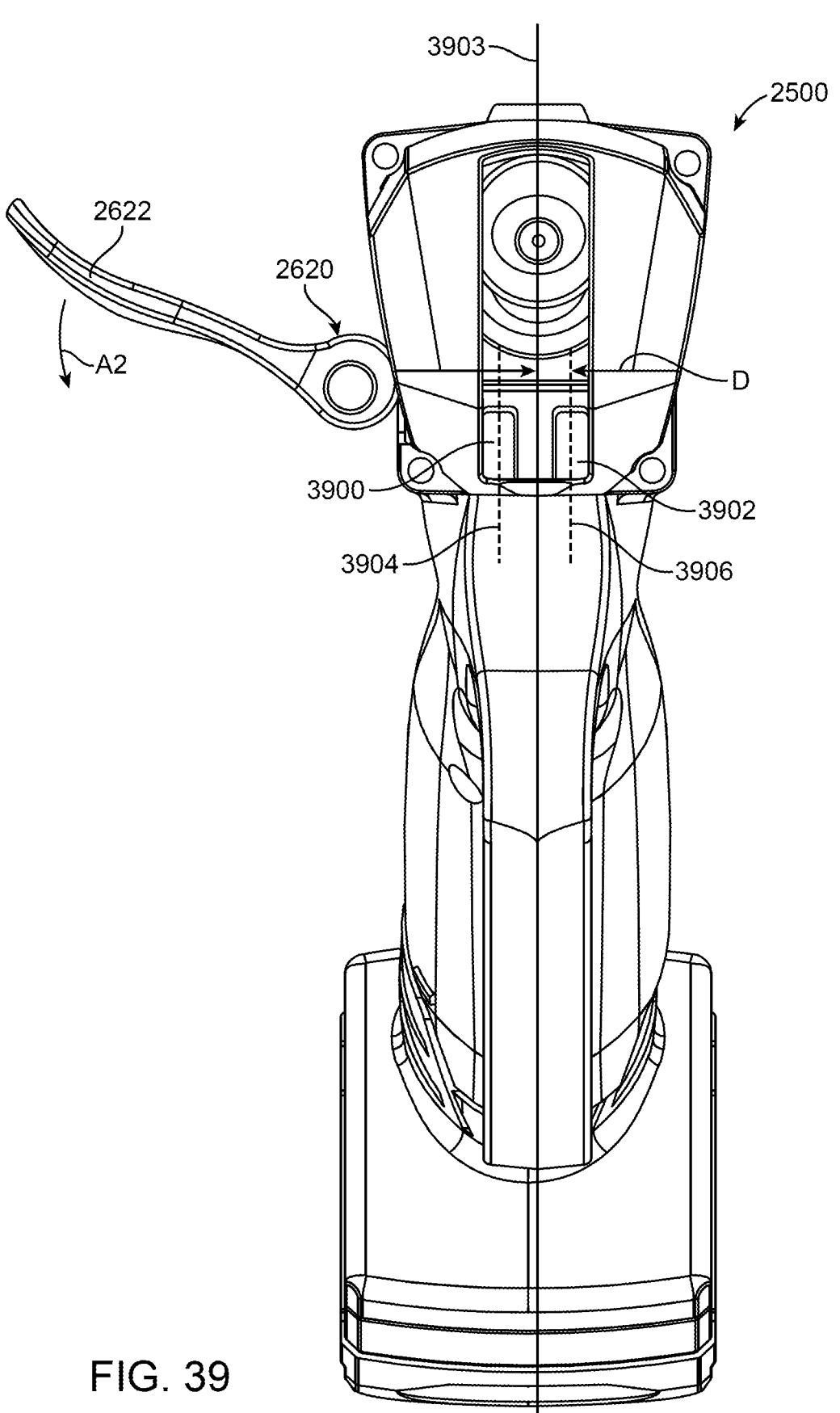
FIG. 39 is a front view of the third metal snips with the blade assembly removed in accordance with an embodiment of the present disclosure.
Figure 40:
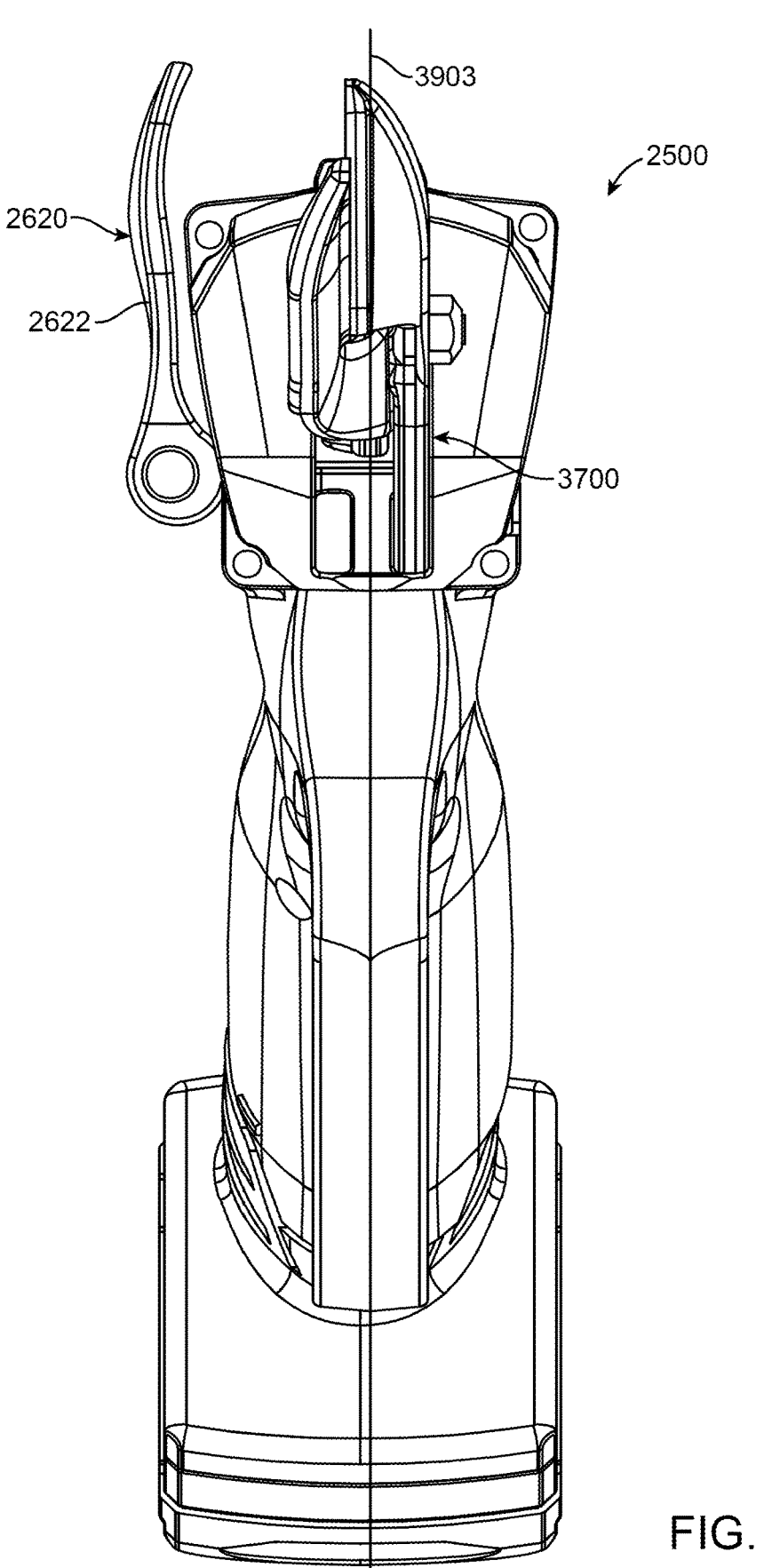
FIG. 40 is a front view of the third metal snips with the left-handed blade assembly installed therein in accordance with an embodiment of the present disclosure.

Referring now to FIGS. 38-40, in a particular aspect, the blade release mechanism 2620 (and the handle 2622, thereof) is movable between a first locked position and an unlocked position. The blade release mechanism 2620 (and the handle 2622, thereof) is also movable between a second locked position and the unlocked position. In the first locked position, shown in FIG. 38, the handle 2622 is rotated about the hinge post 2636 toward the housing 2502, as indicated by arrow A1 in FIG. 38, and the adjustable plunger 2624 is pulled outward relative to the plug 2650 (and the housing 2502) and the beveled surface 2634 of the first locking flange 2630 is engaged with the rounded notch 2680 formed in the extension 2556 of the fixed upper blade 2554 to lock the blade assembly 2550 within the cutting head 2544. In the unlocked position, shown in FIG. 39, the handle 2622 is rotated about the hinge post 2636 away from the housing 2502, as indicated by arrow A2 in FIG. 39, and the adjustable plunger 2624 is pushed inward relative to the plug 2650 (and the housing 2502) and the beveled surface 2634 of the first locking flange 2630 is disengaged with the extension 2556 of the fixed upper blade 2554 to unlock the blade assembly 2550 and to allow the blade assembly 2550 to be removed from the cutting head 2544.

FIG. 39 shows that the cutting head 2544 of the metal snips 2500 includes a first blade assembly receptacle 3900 and a second blade assembly receptacle 3902. The blade assembly receptacles 3900, 3902 extend into the cutting head 2544 and are configured to receive the blade assemblies 2550, 3700. The blade assembly receptacles 3900, 3902 are adjacent the adjustable plunger 2624 of the blade release mechanism 2620 and when the extensions 2556, 3704 of the blade assemblies 2550, 3700 are installed within the blade assembly receptacles 3900, 3902 the plunger 2624 moves in a direction along an axis transverse to the extensions 2556, 3704 of the blade assemblies 2550, 3700. In a particular aspect, the first blade assembly receptacle 3900 is configured to receive the extension 2556 of the right-handed blade assembly 2550. The second blade assembly receptacle 3902 is configured to receive the extension 3704 of the left-handed blade assembly 3700. In either case, when the right-handed blade assembly 2550 is installed in the first blade assembly receptacle 3900 or the left-handed blade assembly 3700 is installed in the second blade assembly receptacle 3902, the lower blade 2558, 3710 is aligned along a drive plane 3903 that passes through the center of the metal snips 2500 and the center of the eccentric drive assembly 2552 about which the eccentric drive assembly 2552 rotates. As such, regardless of whether the right-handed blade assembly 2550 or the left-handed blade assembly 3700 is installed, the upper cam follower arms 2560, 3712 and the lower cam follower arms 2562, 3714 of the lower blades 2558, 3710 are aligned with the drive plane 3903 and the eccentric shifter 2596 that provides the rotational input for driving the lower blades 2558, 3710 of the blade assemblies 2550, 3700 during a cutting motion.

In a particular aspect, each blade assembly receptacle 3900, 3902 defines a length L and a width W when viewed from the end as shown in FIG. 39. In a particular aspect, L is greater than W. Further, L is greater than or equal to 1.25×W, such as greater than or equal to 1.50×W, greater than or equal to 1.75×W, or greater than or equal to 2.00×W. Moreover, L is less than or equal to 3.00×W, such as less than or equal to 2.75×W, less than or equal to 2.50×W, or less than or equal to 2.25×W. It is to be understood that L may be within a range between, and including, any of the minimum and maximum values of L described herein.

As further shown in FIG. 39, each blade assembly receptacle 3900, 3902 includes a central axis 3904, 3906 that is offset from the drive plane 3903 by an offset distance D. In a particular aspect, offset distance D is greater than or equal to 0.900×W, such as greater than or equal to 0.925×W, greater than or equal to 0.950×W, or greater than or equal to 0.975×W. In another aspect, the offset distance D is the same as the width W of the (that is, D equals W.) In still another aspect, the offset distance D is less than or equal to 1.100×W, such as less than or equal to 1.075×W, less than or equal to 1.050×W, or less than or equal to 1.025×W. It is to be understood that D may be within a range between, and including, any of the minimum and maximum values of D described herein.

Figure 41:
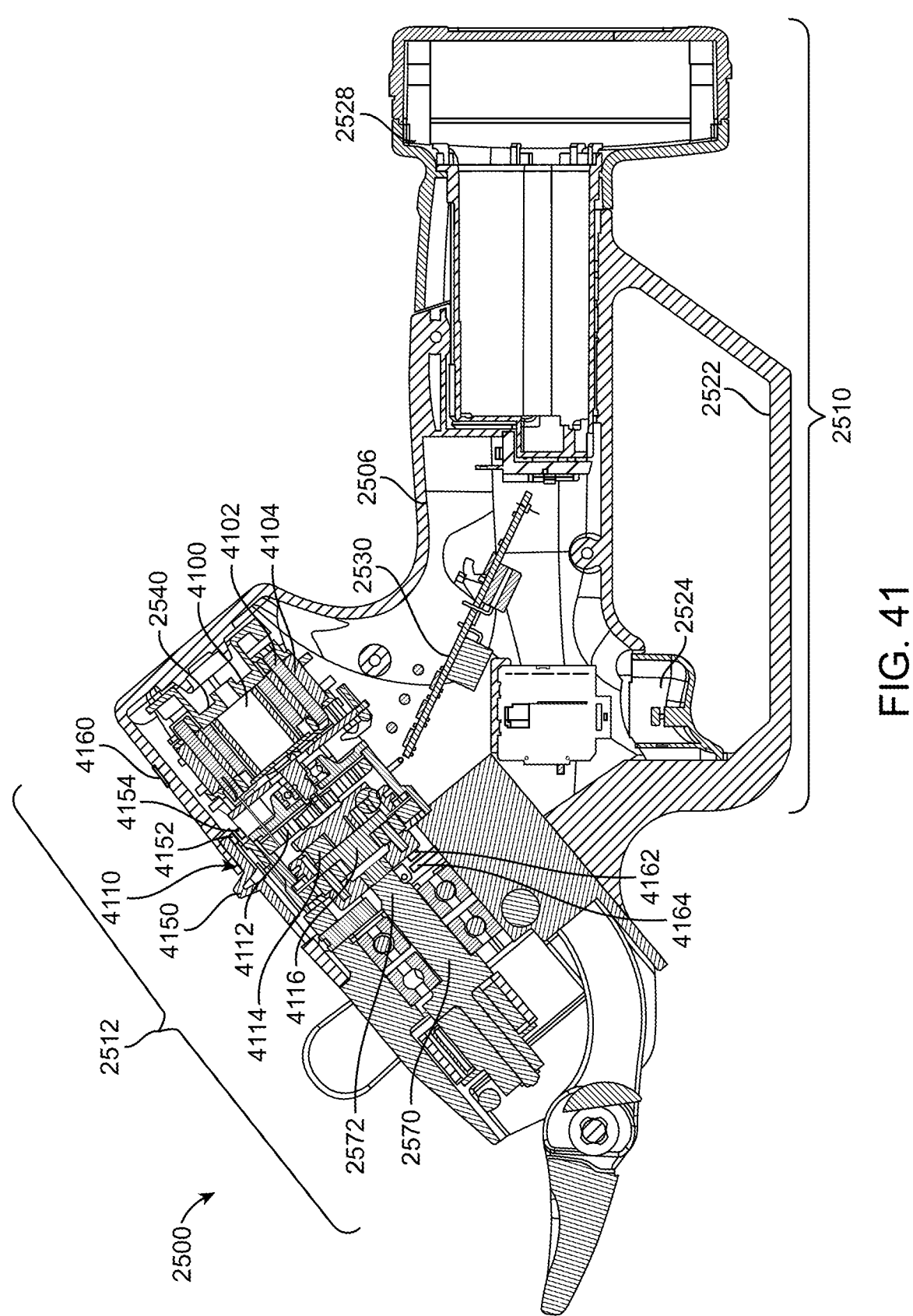
FIG. 41 is a cross section view of the third metal snip take alone Line 41-41 of FIG. 26 in accordance with an embodiment of the present disclosure.

Referring now to FIG. 41, further details regarding the motor 2540 and the gearbox 2542 are illustrated. As shown, the motor 2540 includes a rotor 4100 disposed within a stator 4102. The stator 4102 includes a coil 4104 that is selectively energized by the battery pack 2528 when a user depresses the trigger 2524. The gearbox 2542 includes a gear assembly 4110. In a particular aspect, the gear assembly 4110 is a multi-stage gear assembly. Further, in a particular aspect, the gear assembly 4110 is a three-stage gear assembly that includes a first planetary gear seat 4112 that is operably coupled to the rotor 4100 of the motor 2540 to provide input to the gear assembly 4110. The gear assembly 4110 also includes second planetary gear set 4114 and a third planetary gear set 4116. The third planetary gear seat 4116 is operably coupled to the input shaft portion 2572 of the eccentric drive shaft 2570 to rotate the eccentric drive shaft 2570. The gear assembly 4110 is selectively movable to allow all of the planetary gear sets 4112 to rotate and transmit torque through the gear assembly 4110 or to allow only the first planetary gear set 4112 and the third planetary gear set 4116 to rotate and transmit torque through the gear assembly 4110. As such, the gear assembly 4110 provides two speeds. Each planetary gear set 4116 may include a sun gear, a plurality of planet gears disposed on a planet carrier, and a ring gear around the planet gears. Accordingly, as the rotor 4100 within the motor 2540 rotates, that rotational movement is transmitted to the eccentric drive shaft 2570 via the gear assembly 4110 within the gearbox 2542. As the eccentric drive shaft 2570 rotates, the lower blade 2558, 3710 of the blade assembly 2550, 3700 rotates back-and-forth on the pivot 2564, 3716 and provides the cutting action, or cutting motion, necessary to cut a workpiece.

In another aspect, the first planetary gear set 4112 is operably coupled with the second planetary gear set 4114, which, in turn, is engaged with the third planetary gear set 4116. Further, in this aspect, the gear assembly 4110 of the metal snips 2500 includes a sprag gear between the ring gear of the second planetary gear set 4116 and the gearbox 2542. When the gear assembly 4110 rotates in a first direction, all three gear planetary gear sets 4112, 4114, 4116 are engaged and rotate to transmit torque. When the gear assembly 4110 rotates in a second direction, the sprag gear releases the ring gear of the second planetary gear set 4116 and the second planetary gear set 4116 rotates freely without transmitting torque, while the first planetary gear set 4112 and the third planetary gear set 4116 are engaged to transmit torque.

FIG. 41 further shows that the metal snips 2500 include a mode selector switch 4150 slidably disposed on the cutting head portion 2512 of the housing 2502. It can be appreciated that the mode selector switch 4150 can also be slidably disposed on the handle portion 2510 of the housing 2502.

The mode selector switch 4150 is slidable forward toward the cutting head 2544 and rearward toward the motor 2540. A first magnet 4152 is disposed on the mode selector switch 4150 on the end of the mode selector switch 4150 nearest to the motor 2540. A first Hall sensor 4154 is installed within the housing 2502 of the metal snips 2500 to detect when the mode selector switch 4150 is moved into the rearward position. When the mode selector switch 4150 is pushed into the forward position in which the first magnet 4152 is distanced from the Hall sensor 4154 and not detectable by the Hall sensor 4154, the Hall sensor 4154 will output a first voltage signal, e.g., 3.3 Volts. On the other hand, when the mode selector switch 4150 is pushed back away from the blades into the rearward position, the Hall sensor 4154 will detect the presence of the first magnet 4152 above the Hall sensor 4154 and the Hall sensor 4154 will output a second voltage signal, e.g., 0 Volts. When a controller on the circuit board 2530 receives the first voltage signal, the motor 2540 will rotate in a counter-clockwise direction for a scroll cut mode. When the controller on the circuit board 2530 receives the second voltage signal from the Hall sensor 4154, the motor 2540 will rotate in a clockwise direction for a notch cut mode. In the scroll cut mode, the metal snips 2500 may be used to cut holes (circular or polygonal), to make straight cuts, to cut spiral seams, to cut s-cleats, etc. In the notch cut mode, the metal snips 2500 may be used to cut notches, to turn 90 degree corners around rectangular duct, to cut s-cleats, etc. In the scroll cut mode, the metal snips 2500 operate at a higher speed, i.e., revolutions per minute (RPM). In the notch cut mode, the metal snips 2500 operate at a lower RPM. As such, the metal snips 2500 are capable of cutting metal of various gauge sizes, as described in greater detail below.

FIG. 41 further indicates that the metal snips 2500 includes a blade change button 4160 disposed on the cutting head portion 2512 of the housing 2502. It can be appreciated that the blade change button 4160 can also be disposed on the handle portion 2510 of the housing 2502. The metal snips 2500 also include a second magnet 4162 place on a portion of the gear assembly 4110 that rotates with the eccentric drive shaft 2570 in order to locate the angular position of the eccentric drive shaft 2570. A second Hall sensor 4164 is disposed within the housing 2502 in a position to sense the second magnet 4162. When the blade change button 4160 is depressed, the controller on the circuit board 2530 rotates the rotor 4100 within the motor 2540 until the second magnet 4162 is detected by the second Hall sensor 4164. When the second Hall sensor 4164 outputs voltage signal indicating the second magnet 4162 is adjacent the second Hall sensor 4164, the rotor 4100 is stopped—as is the eccentric drive shaft 2570. This places the eccentric shifter 2596 in a blade change position, e.g., a top dead center position, in which the eccentric shifter 2956 is aligned to allow the blade assembly 2550, 3700 to be installed within the first blade assembly receptacle 3900 or the second blade assembly receptacle 3902 and to allow the lower blade 2558, 3710 of the blade assembly 2550, 3700 to easily fit over the eccentric shifter 2596 without having to manipulate the blade assembly 2550, 3700 or with as little manipulations as possible.

The various embodiments described herein provide for metal snips 100, 300, 2500, having two cutting modes: short stroke and long stroke (aka, scroll cut mode and notch cut mode). The smaller stroke is desirable for cutting smaller gauge materials like thin sheet metal. The larger stroke allows the blades to open wider for cutting thicker materials.

Each of the designs herein allow for a more compact tool that fits in relatively small spaces for greater ease of use on job sites.

Various features of the invention are set forth in the following claims.

What is claimed is:
1. A power tool, comprising:
a housing;
a motor disposed within the housing;
a first blade;
a second blade movable relative to the first blade by the motor, wherein a cutting stroke length of the first blade relative to the second blade is selectively adjustable based on a direction of rotation of the motor; and
an eccentric drive assembly operably coupled with the motor and the second blade, wherein the eccentric drive assembly is movable between a first position having a first eccentric drive distance and a second position having a second eccentric drive distance, wherein the second eccentric drive distance is different from the first eccentric drive distance;
wherein the eccentric drive assembly is movable between the first position and the second position at least partially based on the direction of rotation of the motor;
wherein the eccentric drive assembly includes an eccentric shifter rotatably disposed on an eccentric drive shaft; and
wherein the eccentric shifter includes a tab and the eccentric drive shaft includes a first tab stop and a second tab stop that selectively engages the tab depending on the rotation of the motor.
2. The power tool of claim 1, wherein the eccentric drive shaft includes a collar having the first tab stop and the second tab stop.
3. The power tool of claim 1, wherein the eccentric shifter defines the first eccentric drive distance when the tab is engaged with the first tab stop.
4. The power tool of claim 3, wherein the eccentric shifter defines the second eccentric drive distance when the tab is engaged with the second tab stop.
5. The metal snips of claim 1, wherein the tab engages the first tab stop in the first position and the second tab stop in the second position.
6. The power tool of claim 1, wherein the eccentric drive shaft includes an input shaft portion and an output shaft portion offset from the input shaft portion.
7. The power tool of claim 6, wherein the eccentric shifter is disposed on the output shaft portion of the eccentric drive shaft.
8. The power tool of claim 1, further comprising a cam disposed on the eccentric shifter, wherein the cam engages a follower arm on the first blade or the second blade in order to drive a cutting motion between the first blade and the second blade as the motor rotates.
9. The power tool of claim 1, further comprising
a mode selector switch;
a magnet disposed on the mode selector switch; and
a sensor positioned to sense the magnet, wherein when the magnet is sensed the motor rotates in a first direction and when the magnet is not sensed the motor rotates in a second direction.
10. The power tool of claim 1, further comprising
a gearbox disposed within the housing and operably coupled to the motor; and wherein the second blade is movable relative to the first blade by the motor via the gearbox, and the gearbox is operable to provide at least two operating speeds for the second blade.

11. The power tool of claim 1, further comprising a handle portion configured to removably receive a battery.

12. A power tool, comprising:

a motor;

an eccentric drive assembly driven by the motor in a first rotation direction and a second rotational direction, the second rotational direction being opposite the first rotational direction, the eccentric drive assembly including an eccentric drive shaft having an input shaft portion and an output shaft portion opposite the input shaft portion, a central collar disposed between the input shaft portion and the output shaft portion, the central collar having a peripheral slot forming a first tab stop and a second tab stop, an eccentric shifter rotatably disposed on the output shaft portion and including an end face and a tab extending therefrom, the tab selectively engageable with the first tab stop due to rotation in the first rotational direction and the second tab stop due to rotation in the second rotational direction, and a cam received about the eccentric shifter;

a first blade; and a second blade movable relative to the first blade, the second blade including a follower arm engaged with an outer surface of the cam.

13. The power tool of claim 12, wherein the second blade includes two follower arms, one of the follower arms engaged with the outer surface of the cam and another of the follower arms engaged with a portion of the eccentric shifter.

14. The power tool of claim 13, wherein the two follower arms are disposed on opposite sides of a longitudinal axis of the output shaft portion of the eccentric drive shaft.

15. The power tool of claim 12, wherein the eccentric shifter is removably disposed on the eccentric drive shaft, and the eccentric drive assembly further includes a retainer spring received in a slot defined in the eccentric drive shaft to retain the eccentric shifter thereon.

16. The power tool of claim 12, further comprising a bearing disposed on the input shaft portion of the eccentric drive shaft.

* * * * *